(12) United States Patent
Schoenly et al.

(10) Patent No.: US 12,017,627 B2
(45) Date of Patent: *Jun. 25, 2024

(54) VEHICLE HANDLING SYSTEM AND METHOD

(71) Applicant: Transportation IP Holdings, LLC, Norwalk, CT (US)

(72) Inventors: Scott Alan Schoenly, West Melbourne, FL (US); Patricia Sue Lacy, Erie, PA (US); Matthew Ensley, Springfield, MO (US)

(73) Assignee: Transportation IP Holdings, LLC, Norwalk, CT (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/647,596

(22) Filed: Jan. 10, 2022

(65) Prior Publication Data

US 2022/0126800 A1 Apr. 28, 2022

Related U.S. Application Data

(63) Continuation of application No. 16/724,335, filed on Dec. 22, 2019, now Pat. No. 11,235,742, which is a continuation-in-part of application No. 15/918,366, filed on Mar. 12, 2018, now Pat. No. 10,899,350, which is a continuation-in-part of application No. 15/226,953, filed on Aug. 3, 2016, now Pat. No. 10,173,698, and a continuation-in-part of application No. 15/159,893, filed on May 20, 2016, now Pat. No. 9,963,154.

(51) Int. Cl.
*B60T 8/17* (2006.01)
*B60T 17/22* (2006.01)
*B61C 17/12* (2006.01)
*B61H 9/04* (2006.01)

(52) U.S. Cl.
CPC .......... *B60T 8/1705* (2013.01); *B60T 17/228* (2013.01); *B61C 17/12* (2013.01); *B61H 9/04* (2013.01); *B60T 2201/06* (2013.01)

(58) Field of Classification Search
CPC ...... B60L 3/0007; B60L 3/006; B60T 17/228; B61C 17/12; B61H 9/04; B61L 25/025; B61L 15/0072
See application file for complete search history.

(56) References Cited

U.S. PATENT DOCUMENTS

| | | | | |
|---|---|---|---|---|
| 9,963,154 | B2 * | 5/2018 | Schoenly | B60L 3/0007 |
| 10,899,350 | B2 * | 1/2021 | Schoenly | B61L 25/025 |
| 11,235,742 | B2 * | 2/2022 | Schoenly | B61H 9/04 |
| 2008/0128562 | A1 * | 6/2008 | Kumar | B61C 17/12 |
| | | | | 246/186 |
| 2008/0161984 | A1 * | 7/2008 | Hrdlicka | B61L 3/006 |
| | | | | 701/19 |

* cited by examiner

*Primary Examiner* — Yuri Kan
(74) *Attorney, Agent, or Firm* — K&L Gates LLP

(57) ABSTRACT

A method and system include a vehicle control system including a multi-vehicle system. The system includes a controller. The controller determines a slack condition of a multi-vehicle system while the multi-vehicle system is parked. The controller determines the slack condition based on one or more sensor signals received from at least one sensor, the controller configured to control movement of the multi-vehicle system based on the slack condition that is determined while transitioning from being parked to forward motion.

20 Claims, 12 Drawing Sheets

VEHICLE HANDLING SYSTEM AND METHOD

CROSS-REFERENCE TO RELATED APPLICATIONS

This application claims priority to and is a continuation of U.S. patent application Ser. No. 16/724,335, filed 22 Dec. 2019 and entitled "Vehicle Handling System And Method" ("the '335 application"). The '335 application is a continuation-in-part of U.S. patent application Ser. No. 15/918,366, filed 12 Mar. 2018 and entitled "Vehicle Handling System And Method" ("the '366 application"), now issued as U.S. Pat. No. 10,899,350.

The '366 application claims priority to and is a continuation-in-part of U.S. patent Ser. No. 15/226,953, filed 3 Aug. 2016 and entitled "Vehicle Handling System And Method" ("the '953 application"), now issued as U.S. Pat. No. 10,173,698; and of U.S. patent application Ser. No. 15/159,893, filed 20 May 2016 and entitled "Vehicle Handling System And Method" ("the '893 application"), now issued as U.S. Pat. No. 9,963,154.

The entire disclosures of these applications (i.e., the '335 Application, the '366 application, the '953 Application, and the '893 application) are incorporated herein by reference.

BACKGROUND

Technical Field

Embodiments of the subject matter disclosed herein relate to vehicle handling systems and methods.

Discussion of Art

Some known vehicle systems include multiple vehicles connected together so that the vehicles can travel together. Such vehicle systems can be referred to as consists. Some rail vehicle systems can include multiple consists that include locomotives (or other powered rail vehicles) providing propulsive force. This coupling can be mechanical in nature, and/or can be communicative or logical in nature. Logical coupling involves vehicle to vehicle and/or vehicle to wayside communication along with a vehicle control system. Wayside refers to systems that are located offboard of the particular vehicle being referenced.

A vehicle handling system can control parts of a group of vehicles that are moving in a controlled fashion. The group can include vehicles in the front, middle, and rear sections, and/or the group can include vehicles that move left, middle, and right (in the direction of travel), and/or the group can include vehicles that are high, middle, and low when referring to, for example, air, land, and submersible vehicles. While the separate components of the group are communicatively connected together, a variable distance exists between the component vehicles. For example, as the group moves along a path, the distance between vehicles may stretch and contract to maintain assured safe stopping distance. Accordingly, slack may exist between various components of a group. The resulting slack may lead to run-ins or run-outs in relation to the components of the group. This may not be optimal system efficiency.

Slack occurs when the rear section of a group stretches or otherwise extends away from a front section. The rear section of the group may accelerate to a speed faster than the front section, which may cause a collision between vehicles of the group. Conversely, when the rear section of the group moves closer to the front section such that vehicles of the group may be bunched together, a possibility of a run-out exists in that the front section of the group may accelerate to a speed faster than the rear section. During a run-out, a whipping action may cause group vehicles to break apart from one another.

Certain vehicle systems include multiple vehicles that travel together along a route or path. Suitable vehicles systems may include vehicles such as on road trucks, trams, mining equipment, passenger vehicles, marine vessels, aircraft, and the like. The multiple vehicles in one or more vehicle system may travel generally in a line, similar to rail vehicles. However, as the vehicle system travels along a curve in the route, second vehicles that are behind a first vehicle in a direction of movement of the vehicle system may deviate from a travel path or trajectory undertaken by the first vehicle. For example, since the vehicles are not restricted laterally between two lanes of a path, one or more of the second vehicles may take a smaller turning radius or a larger turning radius than the first vehicle around a curve. The one or more second vehicles that deviate from the travel path of the first vehicle may cross a boundary along the route, potentially causing a collision with an object, such as another vehicle system, a tree, a building, an embankment, a telephone pole, a pedestrian, or the like. Such a collision may be undesirable. It may be desirable to have a system or method that differs from those that are currently available.

BRIEF DESCRIPTION

In one embodiment, a system is provided that includes a handling unit comprising a communication device and a controller. The communication device receives first position data at least for a first vehicle of a vehicle system and second position data for a second vehicle of the vehicle system relative to a route on which the vehicle system is traveling. The communication device can send and receive data to and from at least one of the first vehicle and the second vehicle. The controller determines that at least the first vehicle is entering into a curved portion of the route through which the vehicle system is traveling. A control signal is generated based at least in part on the first and second position data as the first vehicle approaches or travels through the curved portion of a route. The first and second vehicles are spaced apart from each other by a separation distance. The controller can change an operating parameter of at least one of the first and second vehicles to control at least one of the separation distance and a deviation distance between a travel path taken by the first vehicle and a travel path taken by the second vehicle through the curved portion of the route.

In one embodiment, a system is provided that includes a system comprising a communication device and a controller. The communication device receives first position data at least for a first vehicle of a vehicle system and second position data for a second vehicle of the vehicle system relative to a route on which the vehicle system is traveling. The communication device can send and receive data to and from at least one of the first vehicle and the second vehicle. The controller determines that at least the first vehicle is entering into a curved portion of the route through which the vehicle system is traveling. A control signal is generated based at least in part on route specific information and on the first and second position data as the first vehicle approaches or travels through the curved portion of a route, and the first and second vehicles are spaced apart from each other by a separation distance. The controller can change an operating parameter of at least one of the first and second vehicles to control at least one of the separation distance and a deviation distance between a travel path taken by the first vehicle and a travel path taken by the second vehicle through the curved portion of the route.

In one embodiment, a method is provided that includes receiving first position data at least for a first vehicle of a vehicle system and second position data for a second vehicle of the vehicle system relative to a route on which the vehicle system is traveling. The method determines that at least the first vehicle is entering into a curved portion of the route through which the vehicle system is traveling. A control signal is generated based at least in part on the first and second position data as the first vehicle approaches or travels through the curved portion of a route, and the first and second vehicles are spaced apart from each other by a separation distance. An operating parameter of at least one of the first and second vehicles is changed to control at least one of the separation distance and a deviation distance between a travel path taken by the first vehicle and a travel path taken by the second vehicle through the curved portion of the route.

Embodiments of the disclosure provide a system that may include a vehicle system including a plurality of vehicles. The vehicle system may travel along a route. Multiple location determination devices are onboard vehicles that form the vehicle system. The location determination devices may output generate position data regarding a location of at least one of the plurality of vehicles. A handling unit is in communication with the plurality of location determination devices. The handling unit may receive the position data from the plurality of location determination devices and control separation distances between the plurality of vehicles based on the position data.

The handling unit may control at least two of the plurality of vehicles as the vehicle system travels through a curved portion of the route. The handling unit may maintain one or more of the separation distances within a determined safe separation range. The determined separation range may be between a lower safe separation distance threshold and an upper safe separation distance threshold.

A vehicle system including a plurality of vehicles along a route may be operated by receiving (by a handling unit) position data regarding the plurality of vehicles from a plurality of location determination devices onboard vehicles in the vehicle system, and controlling (by the handling unit) separation distances between one or more of the plurality of vehicles based on the position data. With the handling unit, separation distances between the plurality of vehicles may be controlled or adjusted based at least in part on features of the route as determined by a route guidance unit that is part of, or in communication with, the handling unit.

In one embodiment, the handling unit may control at least two of the plurality of vehicles as the vehicle system travels through a curved portion of the route. The method may include using the handling unit to maintain one or more of the separation distances within a determined safe separation range. The determined safe separation range may be between a lower safe separation distance threshold and an upper safe separation distance threshold.

BRIEF DESCRIPTION OF THE DRAWINGS

Reference is made to the accompanying drawings in which particular embodiments of the invention are illustrated as described in more detail in the description below, in which.

DETAILED DESCRIPTION

Figure 1:
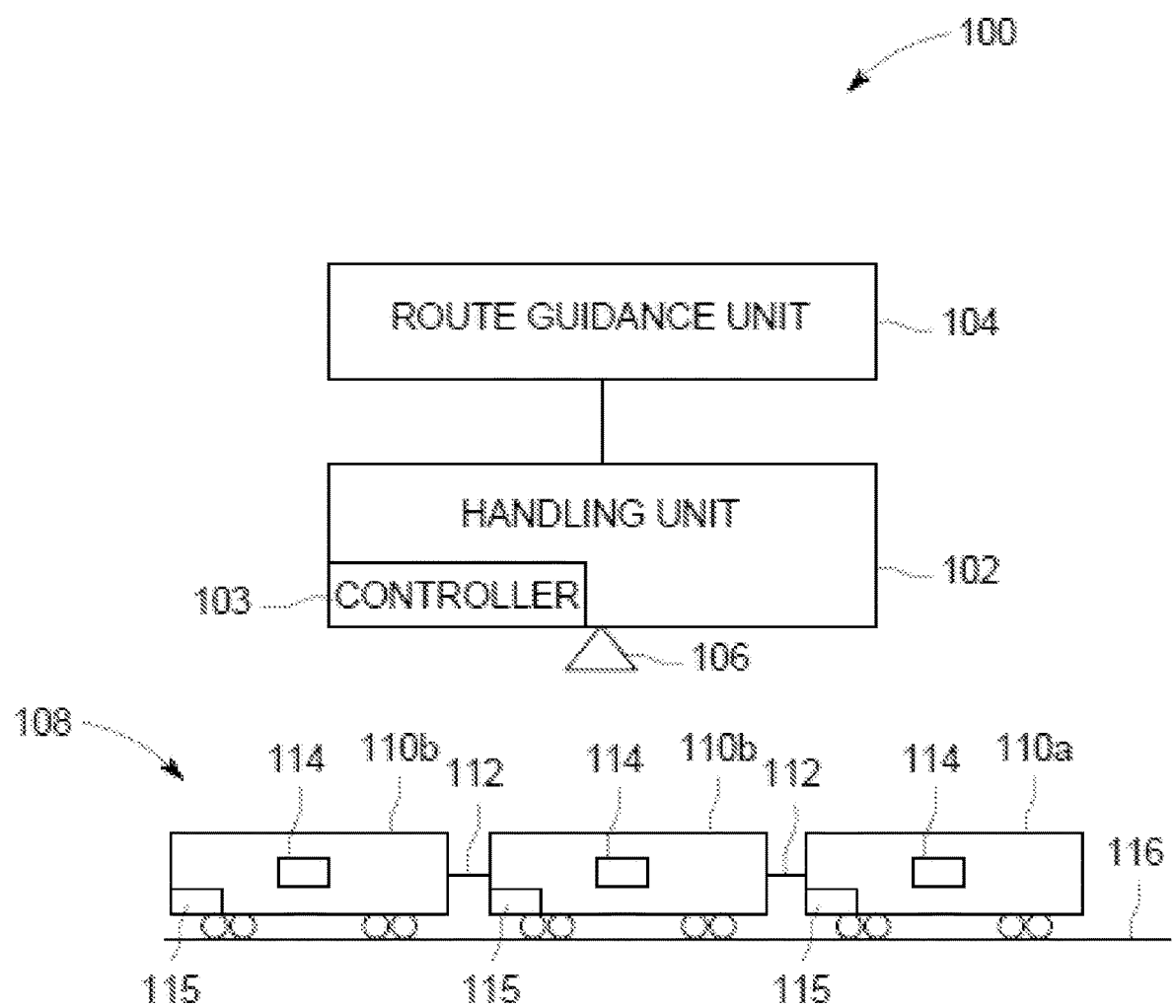
FIG. 1 illustrates a simplified schematic diagram of a vehicle handling system, according to an embodiment of the disclosure.

Embodiments of the disclosure provide a vehicle handling system and method that may control motion of vehicles that form a vehicle system through various features along a route. These features may include, for example, hills, curves, and the like (collectively "curved portions"). Embodiments of the disclosure provide systems and methods that may increase vehicle control, decrease maintenance time and costs, and conserve monetary resources of a vehicle operator.

The term "vehicle" as used herein can be a mobile machine that transports at least one of a person, people, a sensor package, or cargo. For instance, a vehicle can be, but is not limited to being, a rail vehicle, an intermodal container, a locomotive, a marine vessel, mining equipment, construction equipment, an automobile, and the like. Other suitable examples of vehicles are provided herein. A "vehicle system" includes two or more vehicles that are coupled or connected with one another to travel along a route. For example, a vehicle system can include two or more vehicles that are mechanically and directly coupled to one or more other vehicles (e.g., by a coupler) or that are indirectly coupled with one or more other vehicles (e.g., under common control, or controlled based at least in part on communications that pass from one vehicle to another, or from an offboard device to the vehicle).

Certain embodiments of the disclosure provide a system including a vehicle system that includes a plurality of vehicles. The vehicle system may travel along a route. At least one of the vehicles of the vehicle system has a propulsion or traction system that can propel vehicles in the vehicle system along the route. Suitable propulsion systems include, for example, electric motors, air brakes, engines, or mechanical brakes. A handling unit may include a communication device and a controller. The communication device may receive sensor information from plural sensors. The sensor information may indicate, for example, one or more operational conditions of the vehicle system. The controller may generate control signals, based at least in part on the sensor information, for communication by the communication device to one or more of the vehicles. In one embodiment, the control signals may control the propulsion systems to cause controlling of at least two of the vehicles as the vehicle system travels through a curved portion of the route, where the at least two vehicles would not be controlled, or controlled to the same degree, in the absence of the control signals.

In one embodiment, the control signals may control a deviation distance between a travel path taken by a first vehicle of the vehicle system and a travel path taken at least one other vehicle of the vehicle system (such as a second vehicle) as the vehicle system travels through a curved portion of the route. The deviation distance between the first travel path taken by the first vehicle and the second travel path taken by the second vehicle would be greater in the absence of the control signals.

Certain embodiments of the disclosure provide a vehicle handling system and method that may receive vehicle position data from locations within a vehicle system and make handling decisions based upon the received position data. The position data may be received from one or more location determination devices. Suitable location determination devices may include global positioning system (GPS) devices, radio frequency identification (RFI) devices, Bluetooth® devices, lidar systems, radar systems, laser distance finders, optical range finders and video-based systems, time-of-flight devices, stored map databases, and the like. One or more location determination devices may be associated with a component of a vehicle in the vehicle system. In one embodiment, the location determination devices may be remotely located devices that are stationed offboard of the vehicle system.

A handling unit may be in communication with one or more of the location determination devices. The handling unit receives the position data from one or more of the location determination devices and controls operation of the vehicle system accordingly. For example, the handling unit may control throttle and braking of first and second vehicles to control a distance between two or more vehicles in the vehicle system. In one embodiment, the length or distance from one vehicle to another vehicle of the vehicle system is known (for example, stored in memory) by the handling unit. For example, the length of the vehicle system may be output to the handling unit through a communication path. Suitable communication paths include cellular, Wi-Fi™, or other communication paths.

The handling unit may determine the length based at least in part on the number and types of vehicles within the vehicle system, and may include one or more of the vehicle current speed, vehicle speed capabilities, maneuverability, current weight (based, for example, on their loaded or unloaded state), and route specific information. Route specific information may include the type of route or path (e.g., gravel, grassy, rocky, pavement, track, air), the route or path condition (e.g., wet/dry, snow cover, leaf cover, insect cover, maintenance condition (e.g., pot holes)), grade, number of available lanes, and the like. Route specific information may be determined by the controller monitoring changes in the first vehicle. These changes may relate to one or more of wheel slippage, impact or vertical acceleration, lateral acceleration, ambient temperature, humidity level, and wind speed. Thus, as the first vehicle experiences an impact (as measured by, for example, an accelerometer) from a pothole the controller may signal the second vehicle to slow and increase the separation distance, and/or to change lanes to avoid the pothole and increase the deviation distance. As another example, the first vehicle may experience slippage (as sensed by a sudden drop in the load on a traction motor, e.g.) and note that the ambient temperature is below freezing. The first vehicle may signal to the second vehicle located in the same lane on the route so that it may slow and increase the separation distance, and/or to not attempt a lane change and increase the deviation distance.

In one embodiment, the length may be determined through a stretch test. In a stretch test, a first vehicle may be determined as a baseline speed, while another vehicle is controlled in a direction away from or skewed from the first vehicle. During such movement, distances between location determination devices calculate (such as through GPS coordinates) a determined distance and time to stop between vehicles in the group. The determined distance may act as, for example, an assured safe distance. Optionally, more vehicles can participate in the stretch test.

In one embodiment, the length of the vehicle system may be determined through a control test. In a control test, a first vehicle is designated as an anchor, while a second vehicle is controlled propel toward the first vehicle. During such movement, distances (i.e., the length) between location determination devices calculate (such as through GPS coordinates) a determined distance, such as an assured safe distance). The determined distance is calculated similarly to the stretch test. Optionally, more vehicles can be used.

In one embodiment, the length may be determined through an effort test. In an effort test, all vehicles, or portions of the vehicle system, are propelled at known speeds or tractive efforts to determine which effort level from which vehicle achieves a desired vehicle spacing in the group. The results of an effort test may be used to determined individual vehicle system capabilities to move vehicles within a defined group or system.

In one embodiment, the location determination devices may be RFI devices that are used to provide the position data between components of the vehicle system. As the RFI devices pass an RFI reader (such as positioned wayside along a route), the RFI devices and/or the RFI reader(s) may output the position data to the handling unit. Alternatively, optical, video, and other location devices may be used.

Certain embodiments of the disclosure provide systems and methods that may control vehicles in a vehicle system while it moves through curves or over hills to reduce wheel wear. The controller may control the vehicles to reduce fuel consumption by reducing friction. Friction may increase, for example, due to string-lining. Vehicles traveling through different lanes may experience relatively different levels of friction and centrifugal force. By controlling components of a group through curves, components of the group (such as individual vehicles) may be pushed or directed by the controller to a particular lane. This may equalize friction and centrifugal force between the inside and outside vehicles. Accordingly, the systems and methods may reduce maintenance costs and reduce fuel consumption.

A technical effect of one or more embodiments of the disclosure is that they prevent, minimize, or otherwise reduce vehicle component breaks and collisions (such as due to run-ins). Another technical effect of one or more embodiments of the disclosure is that they may reduce maintenance and fuel costs by reducing vehicle breaks and derailments.

Certain other embodiments of the disclosure provide systems and methods that may adjust an operating parameter (e.g., movement, direction, speed, elevation, torque, lane selection) of at least one vehicle of a vehicle system as the vehicle system moves through a curve in the route to cause the at least one vehicle to better align with and follow a travel path taken by another vehicle of the vehicle system along the curve. For example, the vehicle system may be a vehicle system that travels along a route defined by roads (e.g., paved, dirt, gravel, or otherwise), waterways, or the like, instead of on fixed rails of a path. Accordingly, the systems and methods may reduce maintenance costs (as the second vehicles do not travel over rough portions of the route outside of the travel path) of the vehicles and reduce likelihood of collisions between the one or more second vehicles of the vehicle system and external objects. The systems and methods may reduce fuel consumption due to reduced aerodynamic drag by traveling in a more linear and stream-lined formation through the curve.

FIG. 1 illustrates a simplified schematic diagram of a vehicle handling system 100, according to an embodiment of the disclosure. The vehicle handling system may include a handling unit 102 that may be in communication with a route guidance unit 104. The handling unit includes or is coupled to a communication device 106. Suitable communication devices may include wireless and optical based systems.

A vehicle system 108 includes a plurality of vehicles 110. In the illustrated embodiment, the vehicle system includes a powered vehicle 110a that provides propulsive force, and a plurality of unpowered vehicles 110b. Adjacent vehicles are coupled together and operate at a variable but bounded distance 112.

In the illustrated embodiment, the vehicle system is a rail-based group, such that the first vehicle represents a locomotive and the other vehicles represent freight cars. In other embodiments other suitable vehicle systems are disclosed, such as those that may include a truck, such that the first vehicle represents a tractor of the truck and the second vehicles may represent a tractor trailer. The truck may drive on roads (e.g., paved highways). Other vehicles may be off-road utility vehicles, such as for use within mines, quarries, forests, and/or the like. In other embodiments, the vehicle system may include automobiles, aircraft, marine vessels, trams, industrial equipment (drayage, fork lifts, general purpose robots, etc.), and/or other types of vehicles. The vehicles may be mechanically, electronically, and/or communicatively connected to travel together along the route with coordinated movements.

A location sensor, such as a location determination device 114, may be onboard one or more of the vehicles. Optionally, multiple location determination devices may be onboard one of the vehicles. For example, individuals aboard the vehicle system may carry the location determination devices. Suitable location determination devices may be GPS units, RFI units, inertial navigation systems, and the like. One or more location determination devices may detect a position thereof (and therefore the vehicle or where the particular location determination device is located), and output position data that indicates the position of the location determination device. Instead of a location determination device being onboard one or more of the vehicles, a location determination device may be offboard the vehicle. In a work yard for example, wayside (i.e., offboard) devices may track the vehicle locations and then communicate that location data. Naturally, a combination of onboard and offboard location devices may be used.

In one embodiment, the handling unit and the route guidance unit may be onboard one of the vehicles. Alternatively, the handling unit and the route guidance unit may be at a location that is remote, separate, and distinct from the vehicle system. For example, the handling unit and the route guidance unit may be located at a central monitoring station that is in communication with the vehicle system.

During operation, the vehicles that form the vehicle system travel along a route 116. Depending on the vehicle system, and vehicle types involved, the route or path may include a rail track, a road, a waterway, a defined airspace, and the like. The route guidance unit directs the vehicles along the route. The route guidance unit may include one or more memory units that store information about the route, such as maps of valleys, hills, curves, stops, and/or the like. The route guidance unit may direct tractive and braking effort of the vehicle system. For example, the route guidance unit may direct the vehicle system to reduce speed, increase speed, and/or the like at various portions along the route.

The handling unit is in communication with one or more of the location determination devices of the vehicles. The handling unit receives position data from one or more of the location determination devices. As such, the handling unit's controller determines the position of one or more of the vehicles relative to one another based at least in part on the position data received from the location determination devices. Accordingly, the handling unit's controller may determine, for example, whether distance between the vehicles are increasing or decreasing. It may determine whether that distance is along the direction of travel, or perpendicular to the direction of travel. That is, it can determine if the distance change is due to differences in relative speed, or to something else, such as lane changing, elevation changes, drift, and the like.

In response to a determination of a change in distance or a change in the operating conditions, the controller may generate a control signal to affect an operating change in one or both of the vehicles. If, for example, the distance between the vehicles is increasing, the handling unit may reduce the speed of one vehicle (such as through reduced power and/or braking) and/or increase the speed of the other vehicle (such as through increased power and/or reduced brake application, for example) so that the distance between the vehicle returns to a determined distance or range. A determined distance or range may be a determined distance or range that increases safety or reduces a likelihood of a run-in or a run-out. If, on the other hand, the distance between the vehicles is decreasing, the handling unit may increase the speed of one vehicle (such as through increased power and/or reduced brake application) and/or decrease the speed of the other vehicle (such as through reduced power and/or controlled brake application) so that the distance between the vehicles returns to the determined desired safe distance or range.

The handling unit may communicate with the route guidance unit to control separation of the vehicles based on features of the route (such as, for example, route specific information). If the vehicle system is approaching a valley along the route (as indicated by the route guidance unit), the handling unit may ensure that the separation distance between the vehicles is controlled and maintained. The downward motion of the vehicle system into the valley may increase the speed of the first vehicle and it may try to pull away from the second vehicle. Similarly, if the first vehicle approaches a hill, it may slow down and the separation distance may decrease. In order to prevent the second vehicle from slamming into the first vehicle, the controller may slow the movement of the second vehicle or increase the torque and/or speed of the first vehicle (or both) so that the separation distance between the first and second vehicles is maintained. The controller may anticipate the bunching, and modify the separation distance in advance.

The handling unit's controller tracks the relative motion between the vehicles to prevent run-ins and run-outs with respect to the vehicle system. The handling unit receives information from the route guidance unit to determine features of the route and control handling of the vehicle system accordingly. The controller may initiate a lane change or alter the deviation distance to avoid the need to modify the separation distance.

In one embodiment, the handling unit's controller receives the position data from the location determination devices of the vehicles to determine slack conditions or over-extended conditions (for example, a separation distance that is more than a determined separation distance threshold), and direct the vehicles to adjust their respective speeds to ensure that the separation distances therebetween are within a safe separation distance and/or range. In one embodiment, the vehicle handling system provides a closed loop system in which the handling unit controls handling of the vehicles based on the position data received from the location determination devices.

As shown in FIG. 1, the handling unit includes a communication device and a controller 103 that is operably coupled to the communication device. The controller may have one or more processors, internal memory, and the like. The communication device receives sensor information from sensors (such as the location determination devices) onboard the vehicle system. The sensor information is indicative of one or more operational conditions of the vehicle system (for example, speed, location, directional heading, mass/weight, braking or acceleration status or rate, and the like, of the vehicle system generally and/or of individual vehicles within the vehicle system). The controller may generate control signals, based at least in part on the sensor information, for communication by the communication device to traction systems 115 of the vehicles. One or more of the traction systems include at least one of electric motors, air brakes (for example, brakes coupled to a brake pipe that actuate based on an air pressure within the brake pipe), or mechanical brakes (for example, brakes that are actuated by a mechanical linkage and/or a hydraulic/pneumatic line). The control signals may control at least two of the plurality of vehicles as the vehicle system travels through a curved portion of a route where at least two of the plurality of vehicles would not be controlled, or controlled to the same degree, in the absence of the control signals.

Figure 2:
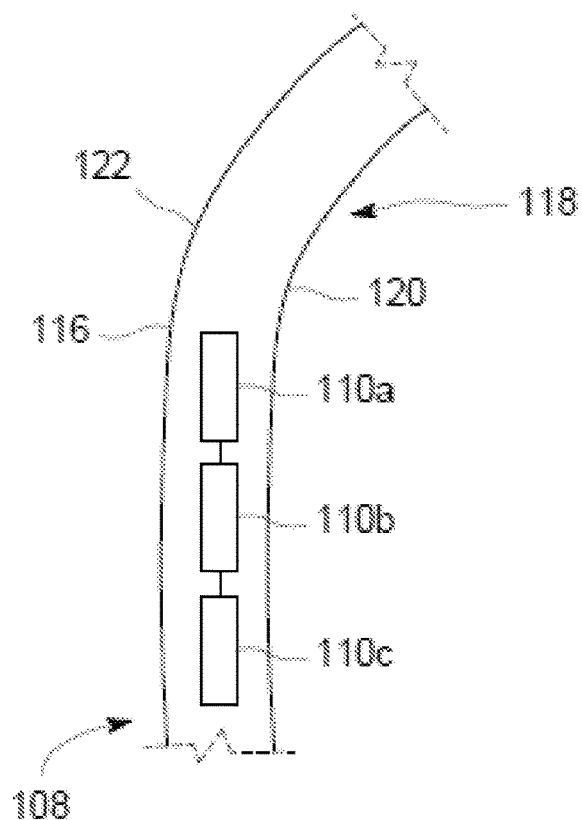
FIG. 2 illustrates a simplified top view of a vehicle system traveling along a route, according to an embodiment of the disclosure.

FIG. 2 illustrates a simplified top view of the vehicle system traveling along the route, according to an embodiment of the disclosure. As shown, the route may include a curve 118. Referring to FIGS. 1 and 2, the route guidance unit detects the upcoming curve within the route. The handling unit is in communication with the route guidance unit. The handling unit receives data that indicates an approach of the upcoming curve, and may adjust the handling of the vehicle system to efficiently move through the curve.

Without the handling unit adjusting motion of the vehicle system as the vehicle system moves through the curve, the front section or vehicle would pull the rest of the vehicles towards a narrower radius of curvature than the travel path taken by the front section or vehicle. For example, in an embodiment in which the vehicle system is a rail-based group, the rear section or vehicle would drag on an inside rail 120 of the path that represents the route. As such, wheels of the vehicle system on the inside rail may emit a squeaking or screeching sound, and would wear faster than the wheels on the outside rail 122. To prevent or otherwise reduce a possibility of squeaking/screeching wheels and wheel wear, the handling unit may control the vehicles together. For example, the handling unit may reduce separation distances between at least two of the vehicles as they travel over the curve. Although reduced, the reduced separation distances may be greater than a lower safe separation distance threshold. By reducing the separation distance(s), the vehicles exert more force on the outside rail, and reduce wheel wear. Controlling the vehicles together through the curve causes an equilibrium between forces exerted by the vehicles on the inside and outside rails, respectively, through the curve, and causes the rear section of the vehicle system to push the vehicle system through the curve (as opposed to, or with a greater force than, the front section pulling the vehicle system through the curve). As such, wheel wear may be reduced, and fuel efficiency may be increased due to a reduced amount of friction between the wheels of the vehicles and the inside rail.

When two points of the vehicle system are detected by the handling unit, through the location determination devices, and the vehicle system is traveling in a straight line, the handling unit calculates the distance between the detected points, such as through GPS coordinates. If, however, the vehicle system is traversing a curve within the route, the route guidance unit provides data regarding the curve to the handling unit. That is, the route guidance unit stores data regarding the route, including the curve, which is then provided to the handling unit. In one embodiment, the route guidance unit may store or otherwise have access to a route database, which includes data regarding the route and other routes.

Figure 3:
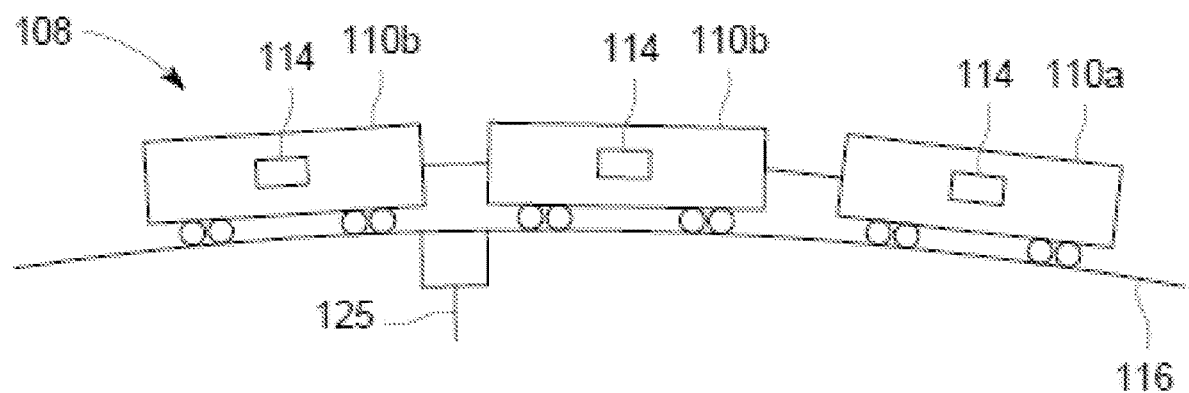
FIG. 3 illustrates a simplified lateral view of a vehicle system traveling along a route, according to an embodiment of the disclosure.

FIG. 3 illustrates a simplified lateral view of the vehicle system traveling along the route, according to an embodiment of the disclosure. In this embodiment, RFI readers 125 may be stationed along the route. The location determination devices may be RFI devices. As the vehicle system travels past the RFI readers, the RFI readers 125 detect the presence of the location determination devices, and output position data of the location determination devices to the handling unit. In this manner, the handling unit may receive the position data in the form of RFI signals, which may be output by the RFI readers and/or the location determination devices.

One or more of the handling unit and the route guidance unit may execute a set of instructions that are stored in one or more storage elements (such as one or more memories), in order to process data. For example, one or more of the handling unit and the route guidance unit may include or be coupled to one or more memories. The storage elements may store data or other information as desired or needed. The storage elements may be in the form of an information source or a physical memory element within a processing machine.

The set of instructions may include various commands that instruct one or more of the handling unit and the route guidance unit as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may include modular programming in the form of object-oriented programming. The processing of input data by the processing machine may be in response to user commands, in response to results of previous processing, or in response to a request made by another processing machine.

Figure 4:
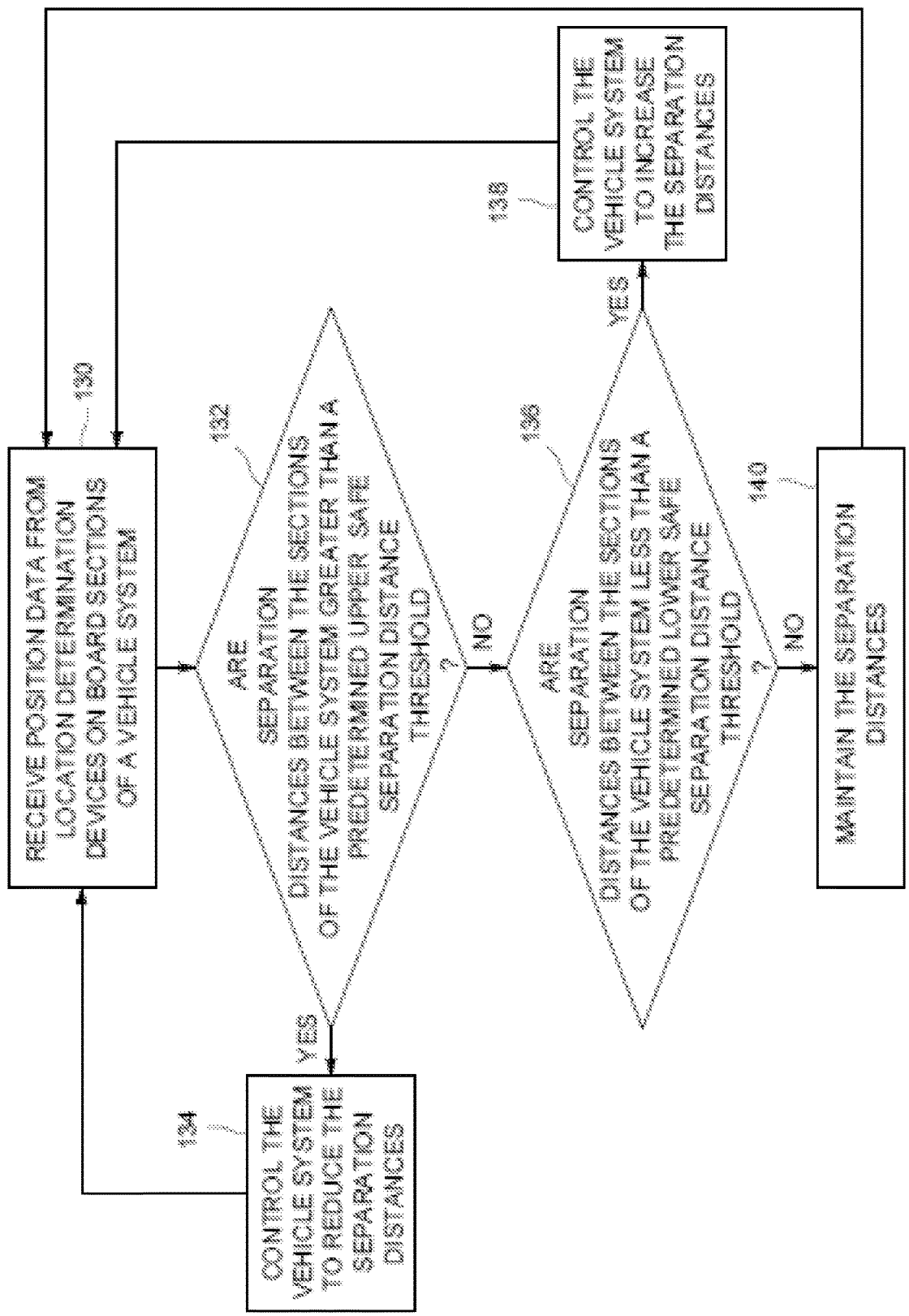
FIG. 4 illustrates a flow chart of a method of controlling a vehicle system, according to an embodiment of the disclosure.

FIG. 4 illustrates a flow chart of a method of controlling a vehicle system, according to an embodiment of the disclosure. The handling unit may operate according to the flow chart shown in FIG. 4.

At 130, position data is received from location determination devices on board sections of the vehicle system. For example, the handling unit may receive the position data from the location determination devices. The sections of the vehicle system may be individual vehicles, or groups of vehicles. In one embodiment, a location determination device may be onboard one or more vehicles within a section. In one embodiment, a location determination device may be onboard less than every vehicle within a section. For example, a section of vehicles may include ten vehicles. A location determination device may be onboard only one of the ten vehicles.

At 132, it is determined whether separation distances between the sections of the vehicle system are greater than a determined upper safe separation distance threshold. If one or more of the separation distances is greater than the determined upper safe separation distance threshold, the method proceeds from 132 to 134, in which the vehicle system is controlled to reduce the separation distance(s). The method then returns to 130 from 134.

If, however, the separation distance(s) is not greater than a determined upper safe distance threshold at 132, the method proceeds to 136, in which it is determined whether the separation distances between the sections of the vehicle system are less than a determined lower safe separation distance threshold. If one or more of the separation distances is less than the determined lower safe separation distance threshold, the method proceeds from 136 to 138, in which the vehicle system is controlled to increase the separation distance(s).

If, however, the separation distance(s) is not less than a determined lower safe distance threshold at 136, the method proceeds from 136 to 140, in which the separation distances are maintained. The method then returns to 130 from 140.

As shown, 132 may occur before 136. Optionally, 132 may occur after 136. In one embodiment, 132 and 136 may occur at or approximately the same time.

As described, embodiments of the disclosure provide vehicle handling systems and methods that control motion of a vehicle system through various features along a route, such as hills, curves, and the like. Embodiments of the disclosure provide systems and methods that increase vehicle control, decrease maintenance time and costs, and ultimately conserve monetary resources of a vehicle operator.

Certain embodiments of the disclosure provide a system including a vehicle system that includes a plurality of vehicles having traction systems. The vehicle system may travel along a route. A handling unit includes a communication device and a controller. The communication device may receive sensor information from plural sensors onboard the vehicle system. The sensor information is indicative of one or more operational conditions of the vehicle system. The controller may generate control signals, based at least in part on the sensor information, for communication by the communication device to the traction systems of the plurality of vehicles. One or more of the traction systems includes at least one of electric motors, air brakes, or mechanical brakes. The control signals may control the traction systems to cause controlling of at least two of the plurality of vehicles as the vehicle system travels through a curved portion of the route where the at least two of the plurality of vehicles would not be controlled, or controlled to the same degree, in the absence of the control signals.

Certain embodiments of the disclosure provide a vehicle handling system and method that may receive vehicle position data from locations on or within a vehicle system and make handling decisions and control the vehicle system based upon the received position data. The position data may be gathered from one or more location determination devices, such as global positioning system (GPS) devices. Alternatively, the location determination devices may include radio frequency identification (RFI) devices, modified distributed power systems, modified end of group systems, or the like. One or more location determination device may be mounted on or in a component of the vehicle system, such as a group vehicle. In one embodiment, the location determination devices may be remote devices that are stationed onboard components of the vehicle.

Certain embodiments of the disclosure provide a system and method that may control a rail-based vehicle system (e.g., group) while it moves through curves in a path in order to reduce rail and wheel wear while reducing fuel consumption by reducing wheel friction. By controlling vehicles of a group through curves, the vehicles push to an outside rail, thereby equalizing friction along the inside and outside rails of the path. Accordingly, the systems and methods reduce maintenance costs (as portions of the vehicles do not unevenly wear) and reduce fuel consumption.

Embodiments of the disclosure provide systems and methods that prevent, minimize, or otherwise reduce vehicle component breaks and derailments (such as due to run-ins). Embodiments of the disclosure reduce maintenance and fuel costs by reducing vehicle breaks and derailments.

Figure 5:
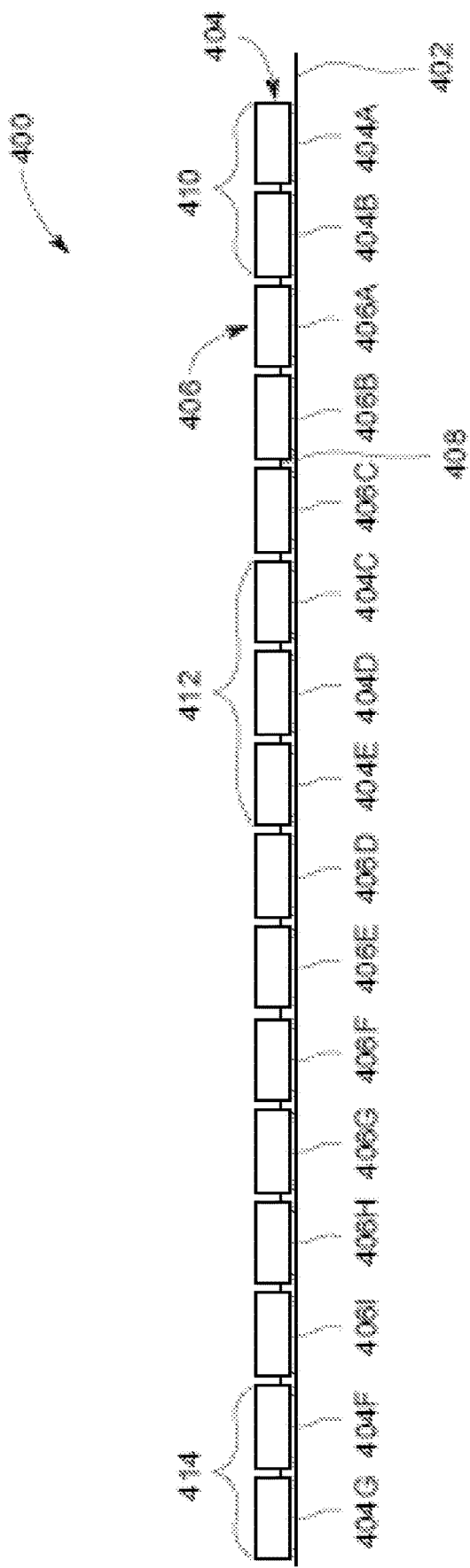
FIG. 5 illustrates a schematic diagram of one example of a vehicle system traveling along a route, according to an embodiment of the disclosure.

FIG. 5 illustrates a schematic diagram of one example of a vehicle system 400 traveling along a route 402, according to an embodiment of the disclosure. The handling unit and the route guidance unit may be used to control operation and handling of the vehicle system.

The vehicle system includes several vehicles 404, 406 operably coupled with each other. One or more location determination devices may be onboard one or more of the vehicles. Optionally, a location determination device may be offboard the vehicles.

In one embodiment, the vehicles may be mechanically coupled with each other. In other embodiments, the vehicles may be coupled logically or communicatively. Other vehicles may be aerodynamically or fluidly coupled when the vehicles travel sufficiently close to each other that the drag force imparted on one or more of the vehicles (e.g., from air, wind, water, or the like) is reduced on one or more other vehicles. Marine vessels may be fluidly or aerodynamically coupled when the vessels travel close enough together such that the drag on one or more vessels from the water is reduced relative to the marine vessels traveling farther apart. Automobiles (e.g., trucks) may be fluidly or aerodynamically coupled when the automobiles travel close enough together such that the drag on one or more automobiles is reduced relative to the automobiles traveling farther apart. Two vehicles may be directly connected with each other when no other vehicle is disposed between the directly connected vehicles. Two vehicles may be indirectly connected or interconnected with each other when one or more other vehicles are disposed between and connected with the interconnected vehicles.

The vehicles (e.g., vehicles 404A-G) represent propulsion-generating vehicles, such as vehicles capable of generating propulsive force to propel the vehicles along the route. Examples of suitable propulsion-generating vehicles include locomotives, off-highway vehicles (e.g., vehicles that are not designed for or permitted to travel on public roadways) including mining equipment, automobiles, aircraft, trucks designed for traveling on public roadways, marine vessels, and the like. The vehicles (e.g., vehicles 406A-I) represent non-propulsion-generating vehicles that are propelled along the route by the propulsion-generating vehicles. The vehicles may be fuel-powered vehicles (e.g., engines that consume fuel are used to generate propulsive force by creating electric current to power motors or to rotate axles and wheels), electric-powered vehicles (e.g., onboard or off board sources of electric current are used to power motors to generate propulsive force), and/or hybrid powered vehicles (e.g., vehicles that are powered by fuel-consuming engines and other sources of electric current). In the illustrated embodiment, the vehicles represent locomotives. In a different embodiment, the vehicle system is a tram that travels on a road or path. In yet another embodiment, the vehicles 404 are trucks (e.g., off-road or on-road trucks), and the vehicles 406 are trailers pulled by the trucks.

The propulsion-generating vehicles may be arranged in consists or groups 410, 412, and 414, as shown in FIG. 5. The vehicle system may include one or more consists, which may in turn include the propulsion-generating vehicles directly connected together. While the consist is shown as including multiple propulsion-generating vehicles, optionally it may include only a single propulsion-generating vehicle.

In one embodiment, tractive efforts (e.g., power output, horsepower, speed, and the like) and/or braking efforts of the vehicle system may be controlled to drive the vehicle system along the route from an origin location to a destination location. For example, the handling unit may control tractive efforts of the vehicle system based on position data received from the location determination devices onboard a plurality of the vehicles. For example, the handling unit may receive the position data from the location determination devices and direct tractive and/or braking of the vehicles of the vehicle system accordingly. The tractive and/or braking efforts may be automatically controlled such that the tractive and/or braking efforts provided by the vehicles are controlled without operator intervention. Alternatively or additionally, the vehicle system may provide prompts and notices to an operator that direct the operator how to manually control the efforts of the vehicle system. For example, the system may provide prompts to an operator to instruct the operator of which operational settings to use at a current time and/or which settings to use at upcoming times when the system arrives at one or more upcoming locations. The operational settings (e.g., settings that control tractive effort, braking effort, etc.) of the propulsion-generating vehicles and/or non-propulsion-generating vehicles may be referred to herein as operational parameters.

In embodiments where the route lacks rails, the route itself may not automatically steer the movement of trailing, or second, vehicles as the vehicle system moves along the route. In one or more embodiments described herein, the vehicle handling system may adjust the movement of a trailing, second vehicle such that a travel path taken by the second vehicle is based on a travel path taken by the first vehicle. For example, the first vehicle may be steered by a human operator along a curve in the route, and the vehicle handling system may autonomously adjust the movement of a following or trailing second vehicle behind the first vehicle to reduce a lateral deviation distance between the travel path taken by the first vehicle and the travel path taken by the second vehicle through the curve (e.g., relative to the amount of deviation distance that would result by not adjusting the movement of the second vehicle). The embodiments of the disclosure increase vehicle control by reducing collisions, improve fuel efficiency of the vehicle system, reduce route and/or vehicle maintenance, and the like.

Figure 6:
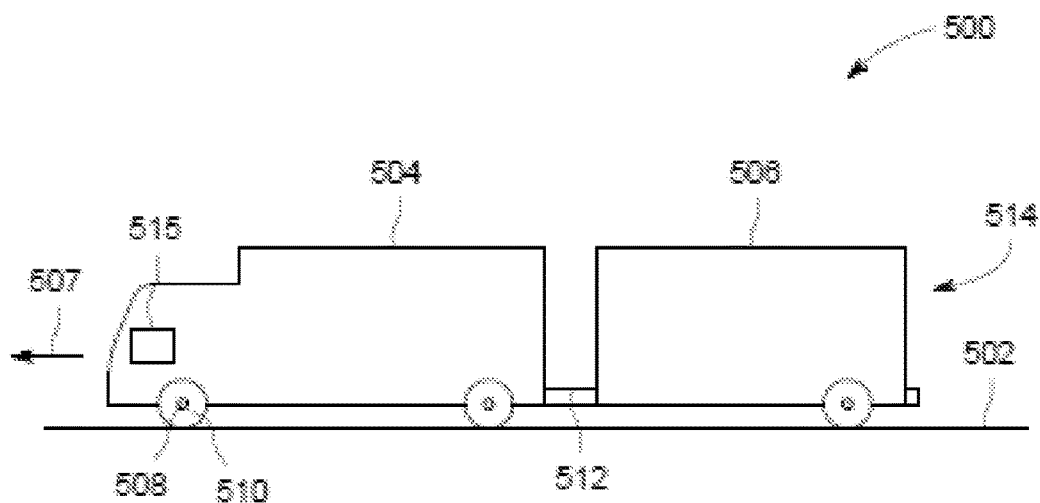
FIG. 6 illustrates a schematic diagram of another example of a vehicle system traveling along a route, according to an embodiment of the disclosure.

FIG. 6 illustrates a schematic diagram of another example of a vehicle system 500 traveling along a path or route 502, according to an embodiment of the disclosure. The handling unit and the route guidance unit may control operation and handling of the vehicle system. The vehicle system includes a first vehicle 504 and a second vehicle 506. The first vehicle may be located in front of the other, second vehicle based on a direction of travel 507 of the vehicle system. The first vehicle may be mechanically coupled to the second vehicle via a coupler 512, which is a mechanical linkage. The first vehicle is a propulsion-generating vehicle that includes a traction system 515. The traction system generates propulsive force for propelling the vehicle system along the route. The traction system may include a battery or fuel-powered engine (e.g., gasoline or diesel) as well as other propulsive elements, such as an electric motor, mechanical brakes, a dynamic braking system, and associated components for propulsion and braking. In the illustrated embodiment, the second vehicle may lack an engine. It may, however, include a battery and traction motors. The second vehicle may be pulled by the propulsion-generating first vehicle, via the coupler, as the vehicle system travels.

In the illustrated embodiment, the vehicle system may travel along a path or road that defines the route. The vehicle system includes vehicles that are trucks that have wheels 508 and that are equipped with tires 510. The first vehicle is a tractor of the truck, and the second vehicle is a trailer of the truck. Although the vehicle system shown only includes one second vehicle, other vehicle systems may include additional trailers. For example, another non-propulsion-generating second vehicle may be mechanically coupled to a rear end 514 of the second vehicle, such that the first vehicle pulls two second vehicles along the route.

Figure 7:
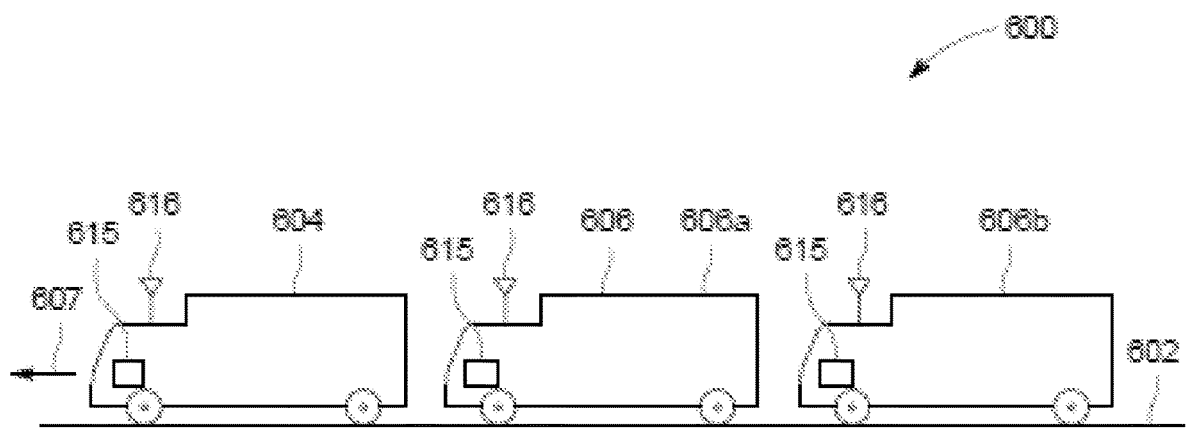
FIG. 7 illustrates a schematic diagram of another example of a vehicle system traveling along a route, according to an embodiment of the disclosure.

FIG. 7 illustrates a schematic diagram of another example of a vehicle system 600 traveling along a route 602, according to an embodiment of the disclosure. The handling unit and the route guidance unit may be control operation and handling of the vehicle system. The vehicle system includes a first vehicle 604 and two second vehicles 606 disposed rearward of the first vehicle based on a direction of travel 607 of the vehicle system. The vehicles travel in a line, such that a second vehicle 606a is disposed between the first vehicle and another second vehicle 606b. In the illustrated embodiment, one or more of the vehicles include a traction system 615 for individually propelling the vehicles along the route.

Unlike the vehicle system shown in FIG. 6, the vehicles of the vehicle system in FIG. 7 are not mechanically coupled to each other. The first vehicle is not mechanically coupled to either of the second vehicles, and the second vehicle is not mechanically coupled to either the first vehicle or the other vehicle. One or more of the vehicles is physically spaced apart from the one or more adjacent vehicles by corresponding separation distances. Although mechanically separate, the vehicles are logically and operationally connected to each other so as to travel together along the route with coordinated movements. The vehicles may be logically connected via a wireless communication link that enables the vehicles to communicate with one another and to coordinate the propulsion and/or braking performed by the separate vehicles. As a result, the separate vehicles travel together along the route as a singular vehicle system with controlled spacing and distance between adjacent vehicles.

A suitable communication link may be a wireless communication network. Wireless messages may be transmitted or broadcast via an established protocol. For example, one or more of the vehicles includes a communication device 616 that may send and receive wireless data and control messages. The control messages are used to control, for example, one or more of the steering, tractive, and braking efforts of the vehicle. In one embodiment, the wireless control messages may be communicated from the first vehicle to one or more of the second vehicles, and the second vehicles may adjust their movement based at least in part on the wireless control messages. This may allow them to coordinate their movement with the first vehicle. For example, the handling unit may be disposed onboard the first vehicle, and the handling unit may generate the wireless control messages for the second vehicles. In another embodiment, the wireless control messages may be communicated from a device that is external to all vehicles (e.g., including the first vehicle). The handling unit may be disposed on an external device that is carried by an operator onboard the first vehicle, or may be disposed offboard and remote from the vehicle system in a dispatch facility or the like.

During operation, the second vehicles do not mirror the movements of the first vehicle. That is, when the first vehicle turns left the second vehicle does not immediately turn left. Rather, it advances to the same location that the first vehicle was when the first vehicle turns left, and then makes its left turn. Similarly, other second vehicles advance from wherever their location may be at the time the first vehicle deviates from a steady state path to the same location that the first vehicle was prior to executing their own turns.

Figure 8:
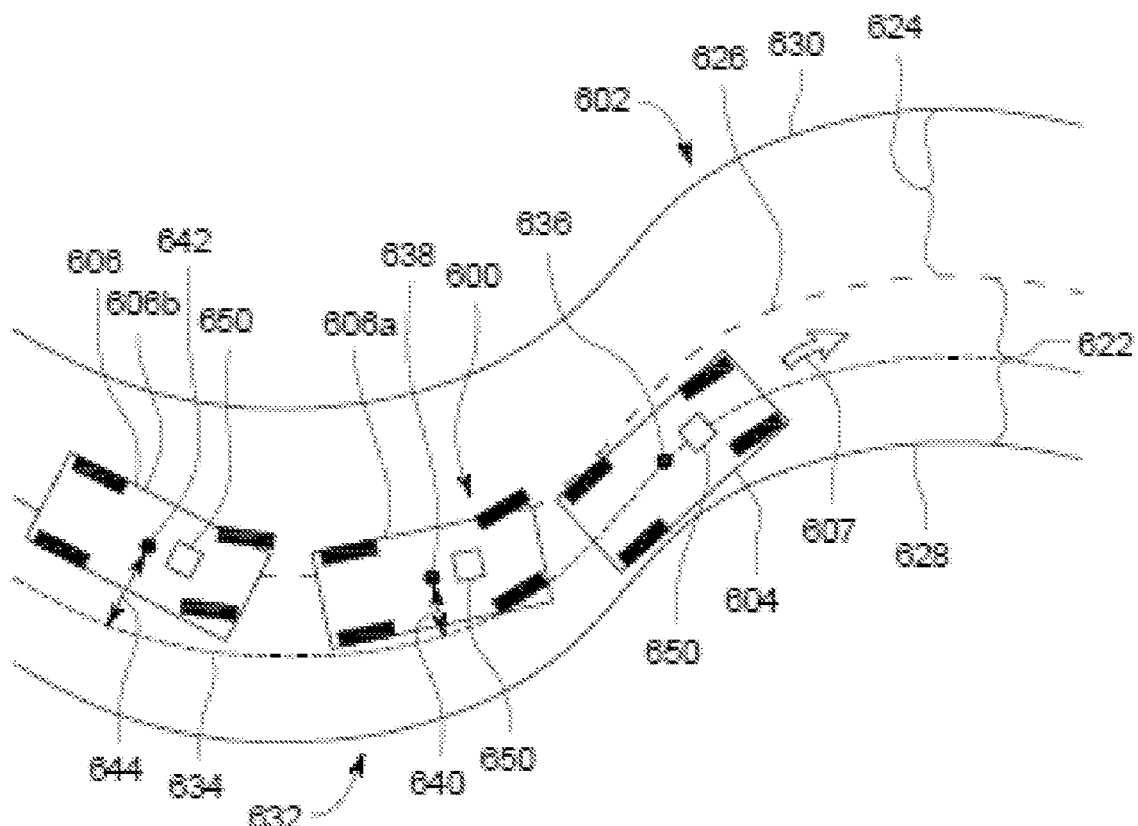
FIG. 8 illustrates a simplified top view of the vehicle system shown in FIG. 7 traveling along the route, according to an embodiment of the disclosure.

FIG. 8 illustrates a simplified top view of the vehicle system 600 traveling along the route 602, according to an embodiment of the disclosure. The second vehicles 606a, 606b follow the first vehicle 604 in a line in the direction of travel 607 of the vehicle system. The route, in this example, is a road with multiple lines that demarcate boundaries of one or more lanes. The road in the illustrated embodiment includes a right lane 622 and a left lane 624. A center line 626 is located between and separates the right and left lanes. The road has a right boundary line 628 and a left boundary line 630. The terms "right" and "left" are based on the direction of travel and are merely for identification of the different lanes of the road. The right lane is defined between the center line and the right boundary line. The left lane is defined between the center line and the left boundary line. The vehicle system is controlled to travel along the road within the right lane in the illustrated embodiment. The left lane may be designated for oncoming traffic in the opposite direction of travel as the vehicle system, or may be designated as a passing lane for traffic moving in the same direction as the vehicle system.

In the illustrated embodiment, the vehicle system is traveling through a curved portion 632 of the road. The first vehicle is controlled (e.g., steered) to maintain a travel path or trajectory 634 within the right lane. The travel path may represent a line whose coordinates are defined by a center point 636 of the first vehicle as the first vehicle travels through the curved portion. The center point may be located at a lateral midpoint and/or a longitudinal midpoint of the first vehicle. The first vehicle is disposed laterally between the right boundary line and the center line within the right lane. However, the second vehicles may deviate from the travel path of the first vehicle, even though the second vehicles may coordinate movement with the first vehicle. For example, one or more of the second vehicles may take a shorter radial path along the curved portion than the first vehicle. In the illustrated embodiment, the curved portion curves to the left such that the left lane is disposed closer to a center of curvature (not shown) than the proximity of the right lane to the center of curvature. Both the second vehicles deviate from the travel path of the first vehicle. For example, a center point 638 of one second vehicle 606a is spaced apart from the travel path of the first vehicle by a first deviation distance 640, and a center point 642 of the other second vehicle 606b is spaced apart from the travel path by a second deviation distance 644. While center points are disclosed here, different vehicles may have different sizes and it may be useful to select a point at a distal edge of the vehicle. Accordingly, any reference to center point shall include any point selected on a vehicle.

In the illustrated embodiment, both of the second vehicles at least partially cross over the center line, extending into the left lane. By at least partially exiting the right lane, the second vehicles may risk colliding with another vehicle, a person, a stationary object, or the like. Even without a collision, the second vehicles may risk damage by traveling along a non-designated and/or undesired portion of the road. For example, the left lane may include loose gravel, tar, ice, or other features that may damage or otherwise reduce stability of the second vehicles. Furthermore, since the vehicle system sweeps laterally along the curved portion, occupying both the right lane (e.g., the first vehicle) and a portion of the left lane (the second vehicles). The vehicles that form the vehicle system may experience increased aerodynamic drag relative to traveling in a more streamlined trajectory. Increased drag reduces fuel efficiency.

To reduce the deviation distances between the travel path of the first vehicle and the respective travel paths of the second vehicles, the controller of the vehicle handling unit may generate control signals to adjust movement of one or both of the second vehicles relative to the movement of the first vehicle through the curved portion. For example, the controller may adjust the movement of the second vehicles to reduce the likelihood of, or to prevent, the second vehicles from crossing over the lines that demarcate the designated lane in which the vehicle system is supposed to operate.

The vehicle system includes at least one location sensor 650 that may determine a location of at least one of the vehicles. All vehicles include a respective location sensor in the illustrated embodiment, but at least some of the vehicles may lack a location sensor in other embodiments. The location sensors generate position data indicative of a location of at least one of the vehicles. As an example of how this works when a vehicle in the vehicle group does not have a location sensor (or has one that has failed), location data taken from other vehicles or other location devices offboard the sensor-less vehicle communicate the appropriate data.

In one embodiment, the location sensors on the second vehicles may determine the lateral proximity of one or more of the second vehicles to either the travel path of the first vehicle or to one or more designated reference objects. For example, the reference object may be the center line or the right boundary line of the path.

In another example, the reference object may be mile markers or other roadside objects. By determining a lateral proximity of the second vehicles to the designated reference objects, the location sensors can be used to determine (e.g., calculate, measure, or the like) the lateral locations of the second vehicles within the road, and more particularly within the right lane. In one embodiment, the location sensors may be RFID sensors, and multiple RFID readers may be stationed at interval locations along the curved portion of the road. The RFID readers may be configured to measure position data indicative of relative proximities of one or more of the vehicles to the RFID readers. Since the RFID readers are located at known, fixed distances to the road, such position data may be used to determine lateral positioning of one or more of the vehicles within the road. Instead of RFID sensors, other location sensors may be used.

In one embodiment, the lateral positioning of the first vehicle may be compared to the lateral positioning of the second vehicles to determine the deviation distances between the travel path of the first vehicle and the travel paths taken by the second vehicles. In another embodiment, it may be assumed that the first vehicle is centered within the right lane (such that the travel path aligns with a center of the right lane). The lateral positioning of the second vehicles may be used to determine how far the second vehicles deviate laterally from a center of the right lane.

In addition to, or instead of, being used to determine lateral positioning of the vehicles, relative to the road, the one or more location sensors may be used to detect when the vehicle system is approaching and traveling through various curved portions of the road. For example, the location sensors may generate position data indicative of a current location of the vehicle system along a designated travel route. The controller of the handling unit may be configured to access a route database stored within (or accessible via) the route guidance unit. The route database may identify different areas as containing curved portions, hills, valleys, and the like. The controller may be configured to compare the current location of the vehicle system to the route database to determine when the vehicle system is approaching and entering a curved portion of the route.

In an embodiment, the communication device may receive the position data from the one or more location sensors onboard the vehicle system. The controller of the handling unit may receive the position data from the communication device, and may generate a control signal based at least in part on the position data. For example, the controller may generate a control signal in response to determining that the vehicle system is approaching or entering a curved portion of the route, such as the curved portion shown in FIG. 8. In another example, the controller may generate a control signal in response to determining that the travel path of at least one of the second vehicles deviates from the travel path of the first vehicle. In an embodiment, the controller may determine that the travel path taken by a second vehicle deviates from the travel path of the first vehicle responsive to the lateral deviation distance exceeding a threshold distance. The threshold distance may be any designated distance, such as 0.25 m, 0.5 m, 1.0 m, or the like. In the illustrated embodiment, the controller may generate the control signal because at least one of the first deviation distance 640 (e.g., between one second vehicle and the travel path of the first vehicle) or the second deviation distance 644 (e.g., between the other second vehicle and the travel path) exceeds the threshold distance.

Optionally, the controller may determine that the travel path taken by the second vehicle deviates from the travel path of the first vehicle responsive to the second vehicle crossing a designated boundary. Thus, the second vehicle crossing a designated boundary may be a triggering event for the controller to generate the control signal instead of, or in addition to, the lateral deviation distances of the second vehicles exceeding a threshold distance. The designated boundary may include one or both of the lines (e.g., the center line and the right boundary line) that demarcate the right lane of the road. In the illustrated embodiment, the controller may generate the control signal because both of the second vehicles cross over the center line.

Figure 9:
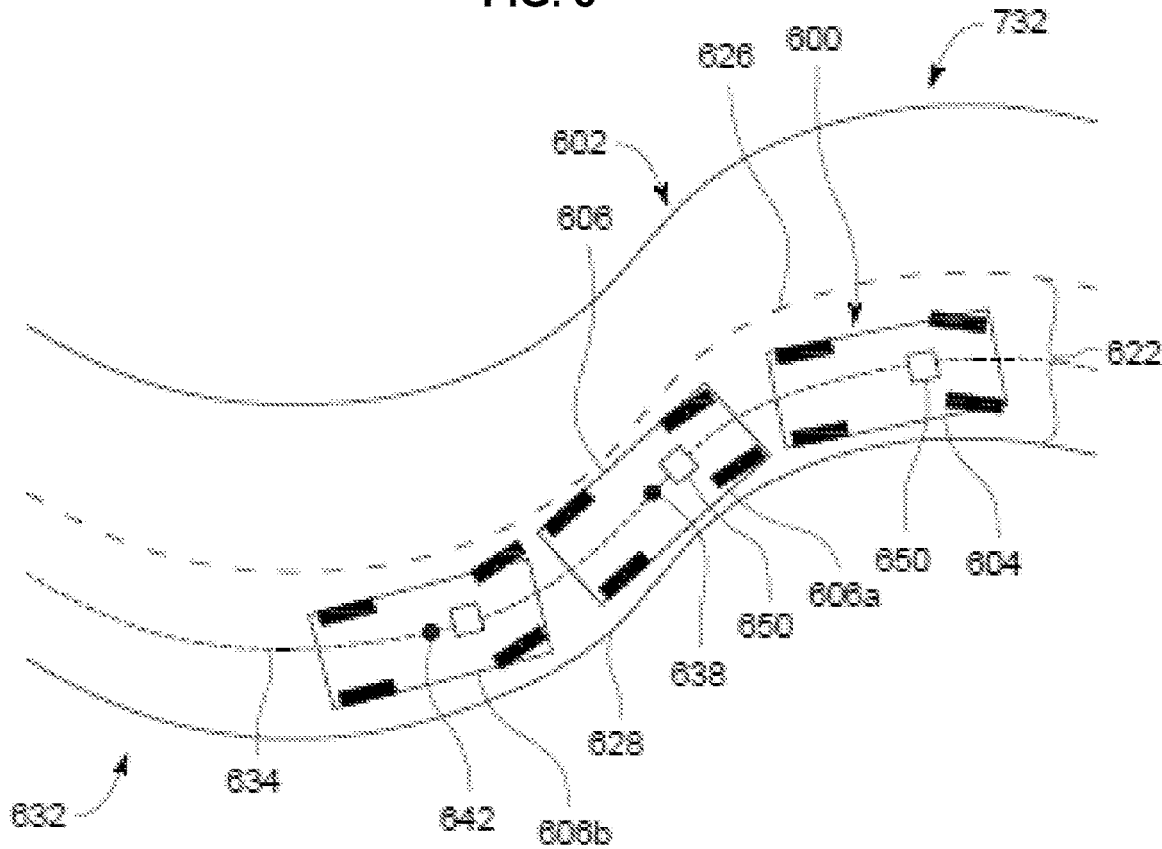
FIG. 9 illustrates a simplified top view of the vehicle system shown in FIG. 7 traveling along the route, according to an embodiment of the disclosure.

FIG. 9 illustrates a simplified top view of the vehicle system 600 traveling along the route, according to an embodiment of the disclosure. The vehicle system in FIG. 9 may be located farther along the route than the location of the vehicle system shown in FIG. 8. For example, the vehicle system in FIG. 9 may be entering a curved portion 732 of the route that is beyond the curved portion 632. The curved portion 732 has an opposite curvature relative to the curved portion 632. FIG. 9 shows the vehicle system after the controller of the handling unit generates the control signal. For example, the control signal generated by the controller may be communicated to one or more of the vehicles of the vehicle system. The control signal may be communicated to all vehicles, or only to some of the vehicles.

As described herein, the control signal may adjust movement of at least one of the second vehicles to reduce a deviation distance between the travel path of the second vehicles and the travel path of the first vehicle as the vehicle system travels through the curved portions of the route. In the illustrated embodiment, the movement of the second vehicles is adjusted such that both of the second vehicles align with the travel path of the first vehicle. For example, the center point of the second vehicle 606a aligns with the travel path, and the center point of the second vehicle 606b also aligns with the travel path. As a result, the travel paths taken by the second vehicles do not deviate (e.g., more than a negligible distance) from the travel path taken by the first vehicle along the end of the curved portion 632 and the beginning of the curved portion 732.

In one embodiment, the control signal adjusts movement of one or more of the second vehicles relative to the first vehicle by actively steering at least one of the second vehicles and/or adjusting the throttle or vehicle speed. Upon receiving the control signal, the second vehicles may adjust the respective steering angle of the second vehicles. In the illustrated embodiment in which the second vehicles have respective traction systems, the active steering of the second vehicles commanded by the control signal may represent modified steering relative to the respective steering of the second vehicles prior to receiving the control signal. The modified steering may cause one or more of the second vehicles to laterally swing outward as the vehicle system travels through the curved portions by a greater distance or extent than the second vehicles would swing without receiving the control signal. For example, the steering may be modified by the control signal by altering a steering angle and/or a steering timing of a respective second vehicle. The modified steering allows the second vehicles to remain within the right lane without crossing over the center line or the right boundary line. The vehicle speed of the vehicle traveling the inside lane may be lower that a vehicle traveling the outside lane. The relative distance between the two vehicles may remain constant as the vehicles navigate the curve of the route.

After generating the control signal, the controller may continue to receive position data from the location sensors, and may generate additional control signals to reduce future deviation distances between the travel path taken by the first vehicle and the travel paths of the second vehicles as the vehicle system continues to travel through the curved portion (as well as through subsequent curved portions along the route).

When approaching or entering a right-hand curve, the controller may generate a control signal that controls the second vehicle to actively steer such that the second vehicle laterally swings wider to the left relative to the route than the second vehicle would swing without receiving the control signal or relative to a steering setting that mimics exactly the steering settings of the first vehicle. Alternatively, the travel path taken by the second vehicle may be controlled to closely align with the travel path taken by the first vehicle along the curved portion but the operation of the propulsion systems of the first and second vehicles may differ. That is, a short axle car and a larger axle truck may need to be controlled differently to achieve a coordinated turn. This would be particularly applicable to a vehicle with independently driven wheels. Further, a truck may have a higher center of gravity, and may be loaded or unloaded. As such, its responsiveness and behavior need to be both known by the controller and accounted for in generating the control signals.

Figure 10:
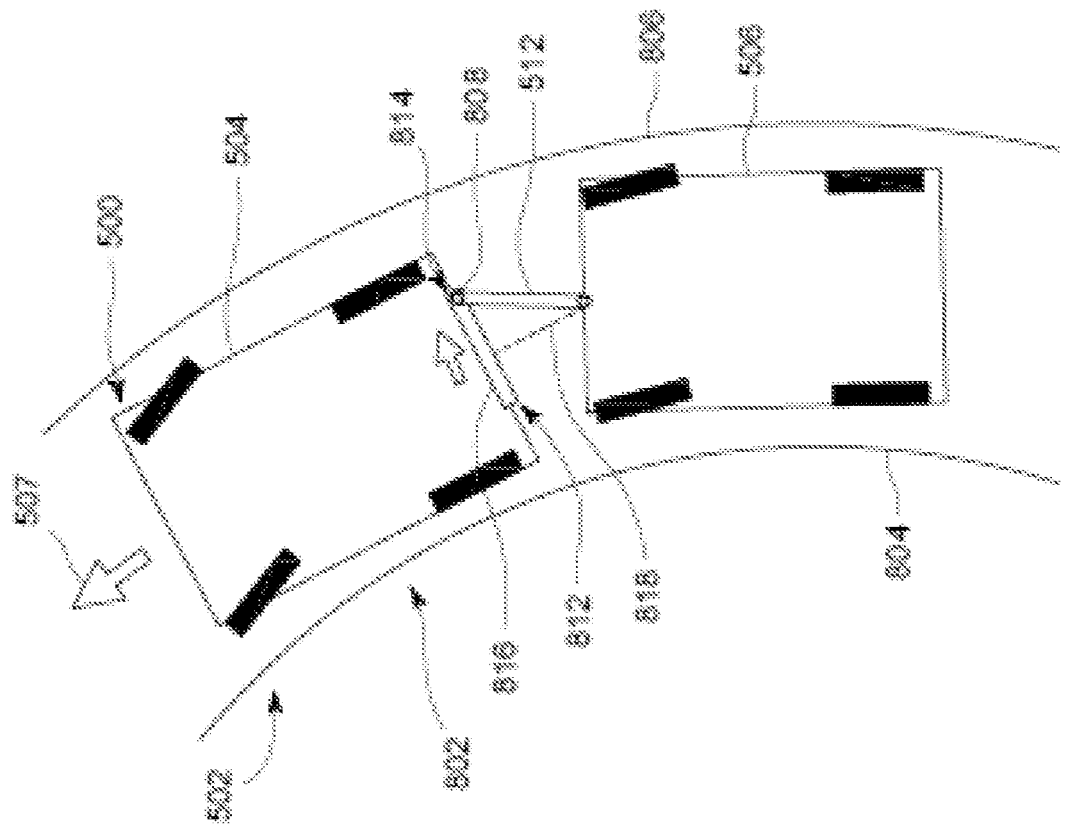
FIG. 10 illustrates a simplified top view of the vehicle system shown in FIG. 6 traveling along the route, according to an embodiment of the disclosure.

FIG. 10 illustrates a simplified top view of a vehicle system 500 traveling along the route, according to an embodiment of the disclosure. The vehicle system is traveling through a curved portion 802 of the route 502. The curved portion includes an inner side 804 and an outer side 806. The inner side has a smaller radius of curvature than the outer side. In the illustrated embodiment, the curved portion is a left-hand curve, so the inner side is a left side of the route, and the outer side is a right side of the route.

With reference to FIG. 6, the first vehicle 504 is coupled to the second vehicle 506 via the coupler 512. The first vehicle pulls the second vehicle through the curved portion of the route in the direction of travel 507. The coupler engages the first vehicle at a hitch 808 of the first vehicle. In the illustrated embodiment, the hitch is adjustable and able to laterally move relative to the first vehicle. For example, the hitch is translatable between a first end 812 and a second end 814 of a hitch assembly 816. The hitch assembly may define a slot or an elongated bar in which the hitch can selectively move between the first and second ends. In the default position, the hitch may be centered between the first and second ends. The line 818 in FIG. 10 shows the default orientation of the coupler which occurs when the hitch is in the default, centered position.

In an embodiment, the control signal received from the controller of the handling unit may adjust movement of the second vehicle relative to the first vehicle by laterally moving the hitch of the first vehicle in a direction towards the outer side of the curved portion of the route. As a result, the second vehicle is pulled more towards the outer side of the curved portion than the second vehicle would be pulled if the hitch is not laterally moved from the default, centered position. In the illustrated embodiment, the hitch is located at or proximate to the second end of the hitch assembly. From the default, centered position, the hitch is laterally moved rightward towards the second end and the outer side of the route.

The control signal received from the controller may trigger a motor associated with the hitch assembly to move the hitch towards the second end. The control signal may designate the direction and distance that the hitch is moved based on position data received from one or more location sensors disposed onboard one or more of the vehicles. For example, the controller may determine that the vehicle system is approaching or entering the left-handed curved portion based on the position data received from the location sensors, and may generate the control signal to laterally move the hitch rightward towards the outer side. Optionally, a length that the hitch is moved along the hitch assembly may be designated by the control signal based on a radius of curvature and/or arc length of the curved portion of the route. For example, the hitch may be moved a greater length towards the second end as the vehicle system travels through a longer and/or sharper (e.g., smaller curvature radius) curved portion relative to the length that the hitch is moved for traveling through a shorter and/or more sweeping (e.g., larger curvature radius) curved portion.

Moving the hitch of the first vehicle towards the outer side causes the second vehicle to laterally swing wider along the curved portion than the second vehicle would swing with the hitch in the default, centered position. For example, without adjusting the hitch position, the second vehicle may take a shorter radius turn than the first vehicle, which may result in the second vehicle crossing over the inner side of the route (e.g., at least partially exiting the designated route). Adjusting the location of the hitch changes the angle at which the second vehicle is pulled by the first vehicle, which pulls the second vehicle more towards the outer side of the route. As a result, adjusting the location of the hitch may reduce the deviation distance between the travel path taken by the first vehicle and the travel path taken by the second vehicle as the vehicle system travels through the curved portion of the route.

Figure 11:
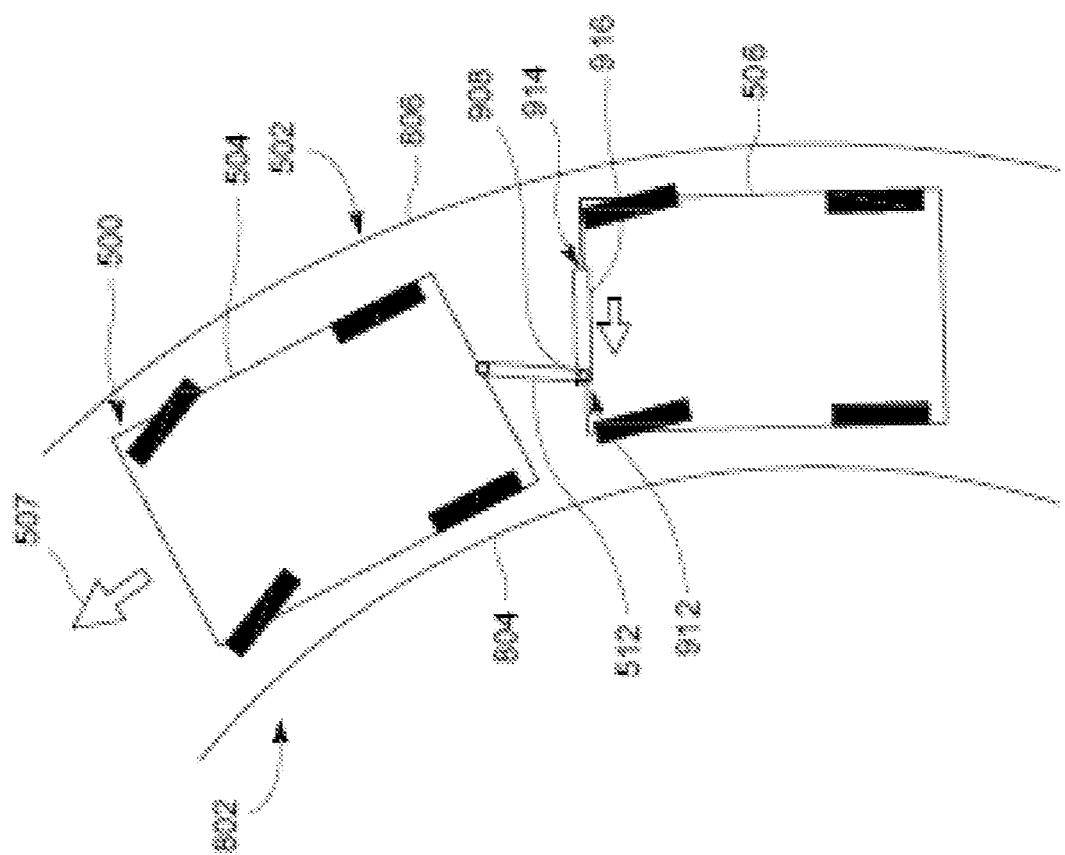
FIG. 11 illustrates a simplified top view of the vehicle system shown in FIG. 6 traveling along the route, according to another embodiment of the disclosure.

FIG. 11 illustrates a simplified top view of the vehicle system 500 traveling along the route, according to another embodiment of the disclosure. The second vehicle 506 has a movable hitch 908 instead of the first vehicle 504. For example, the coupler 512 couples the first vehicle to the second vehicle and engages the movable hitch that is mounted on the second vehicle. The hitch may laterally move between a first end 912 and a second end 914 of a hitch assembly 916.

In the illustrated embodiment, the vehicle system travels along the curved portion of the route. As the vehicle system approaches or enters the curved portion, the controller of the handling unit may generate a control signal that may adjust movement of the second vehicle relative to the first vehicle by laterally moving the hitch of the second vehicle. The control signal may laterally move the hitch from a default, centered position in a direction towards the inner side of the curved portion of the route, which is leftward in the illustrated embodiment. The hitch is located at or proximate to the first end of the hitch assembly in FIG. 11. By moving the hitch towards the first end, the second vehicle may be pulled more towards the outer side of the curved portion as the vehicle system travels through the curved portion than if the hitch is not laterally moved from the default, centered position. As a result of adjusting the position of the hitch, the deviation distance between the travel path taken by the first vehicle and the travel path taken by the second vehicle may be reduced as the vehicle system travels through the curved portion of the route.

Figure 12:
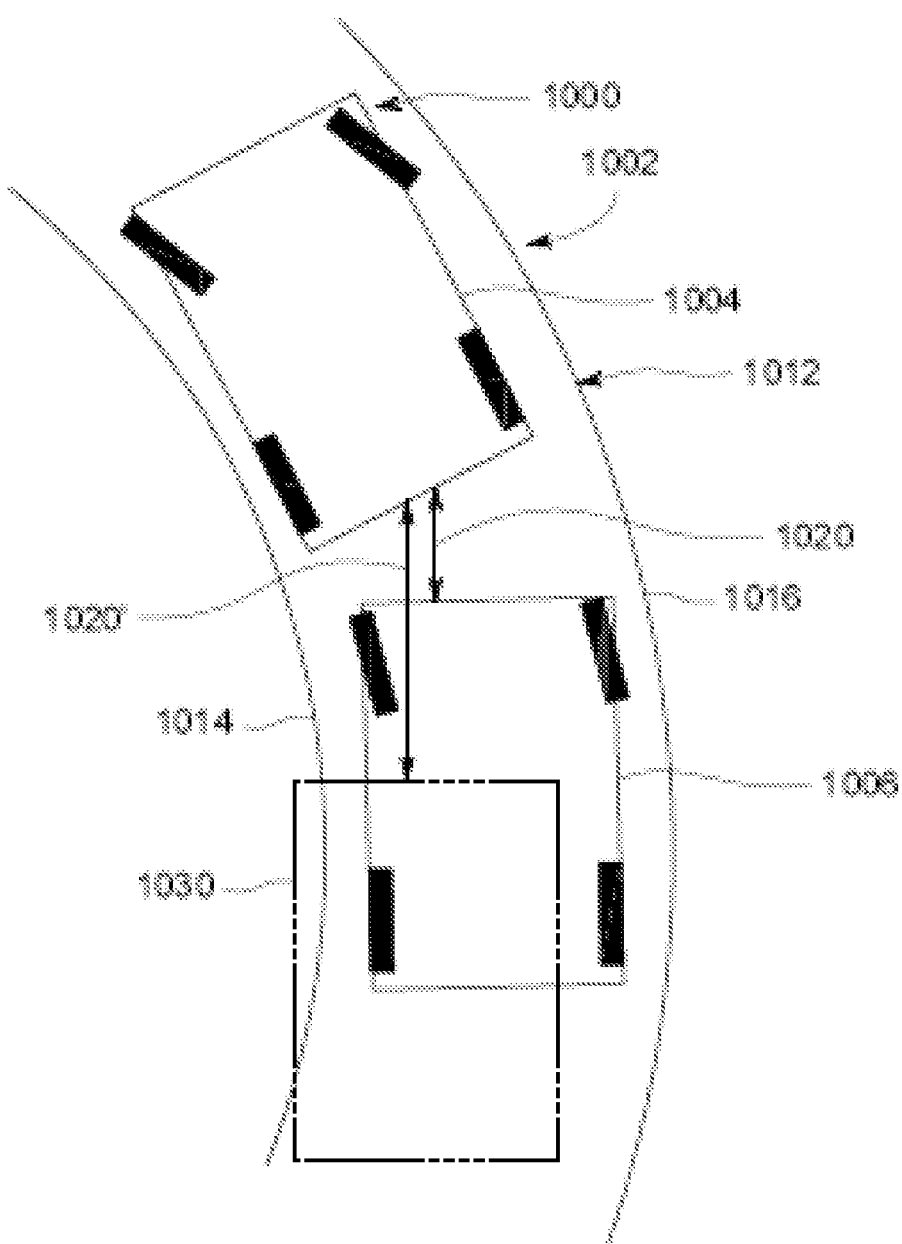
FIG. 12 illustrates a simplified top view of a vehicle system traveling along a curved portion of a route, according to an embodiment of the disclosure.

FIG. 12 illustrates a simplified top view of a vehicle system 1000 traveling along a curved portion 1012 of a route 1002, according to an embodiment of the disclosure. The vehicle system includes a first vehicle 1004 and a second vehicle 1006. The second vehicle is not mechanically coupled to the first vehicle, but movement of the first and second vehicles is coordinated by communicating wirelessly through a communication link. Both the first vehicle and the second vehicle include respective traction systems (not shown) that propelled the respective vehicles along the route. In the illustrated embodiment, the vehicles may be trucks and the route may be a road. A curved portion 1012 of the route includes an inner side 1014 and an outer side 1016, and is divided into lanes. As vehicles of the vehicle system travels through the curved portion, the first vehicle may be controlled to steer and remain in a determined lane between the inner side and the outer side. The movement of the second vehicle may coordinate with the first vehicle such that the second vehicle moves based at least in part on the movement of the first vehicle.

In an embodiment, the controller or handling unit may generate a control signal in response to the vehicle system approaching or entering the curved portion of the route. The control signal may adjust movement of the second vehicle relative to the first vehicle by increasing a force generated by the traction system of the second vehicle. This may be done relative to the force being applied by traction system of the first vehicle, or it may be done without regard to the first vehicle force. A goal would be to control (e.g., reduce) a separation distance 1020 between the first vehicle and the second vehicle. For example, the propulsive force generated by the second vehicle may exceed the propulsive force generated by the first vehicle such that second vehicle travels faster than the first vehicle, at least temporarily. By traveling faster than the first vehicle, the second vehicle may transition from an initial deviation or separation distance 1020' to a reduced separation distance 1020, as shown in FIG. 12. The initial separation distance may represent the distance between the vehicles while the vehicle system travels through linear or generally linear portions of the route. The reduced separation distance may be caused by controlling the vehicles to be closer together than the vehicles would travel in a different section of the route or under different travel conditions (e.g., weather related differences). Instead of increasing the propulsive force generated by the second vehicle relative to the first vehicle, the controlling may be accomplished by slowing (e.g., braking) the first vehicle at an earlier time or to a greater extent than the second vehicle. Although the separation distance may be reduced, the vehicles may be controlled to maintain at least a designated minimum distance therebetween for acceptable handling and control.

As shown in FIG. 12, by reducing the separation distance, the second vehicle may be able to more closely follow the travel path of the first vehicle than if the second vehicle is spaced farther apart from the first vehicle. For example, the dashed box 1030 represents a footprint of the second vehicle traveling around the curved portion at the initial separation distance. At the initial separation distance, the second vehicle may risk crossing over the inner side of the route. Extending beyond the route may risk damage to the vehicle and external objects due to collisions, and may increase aerodynamic drag on the vehicle system, reducing fuel efficiency.

Figure 13:
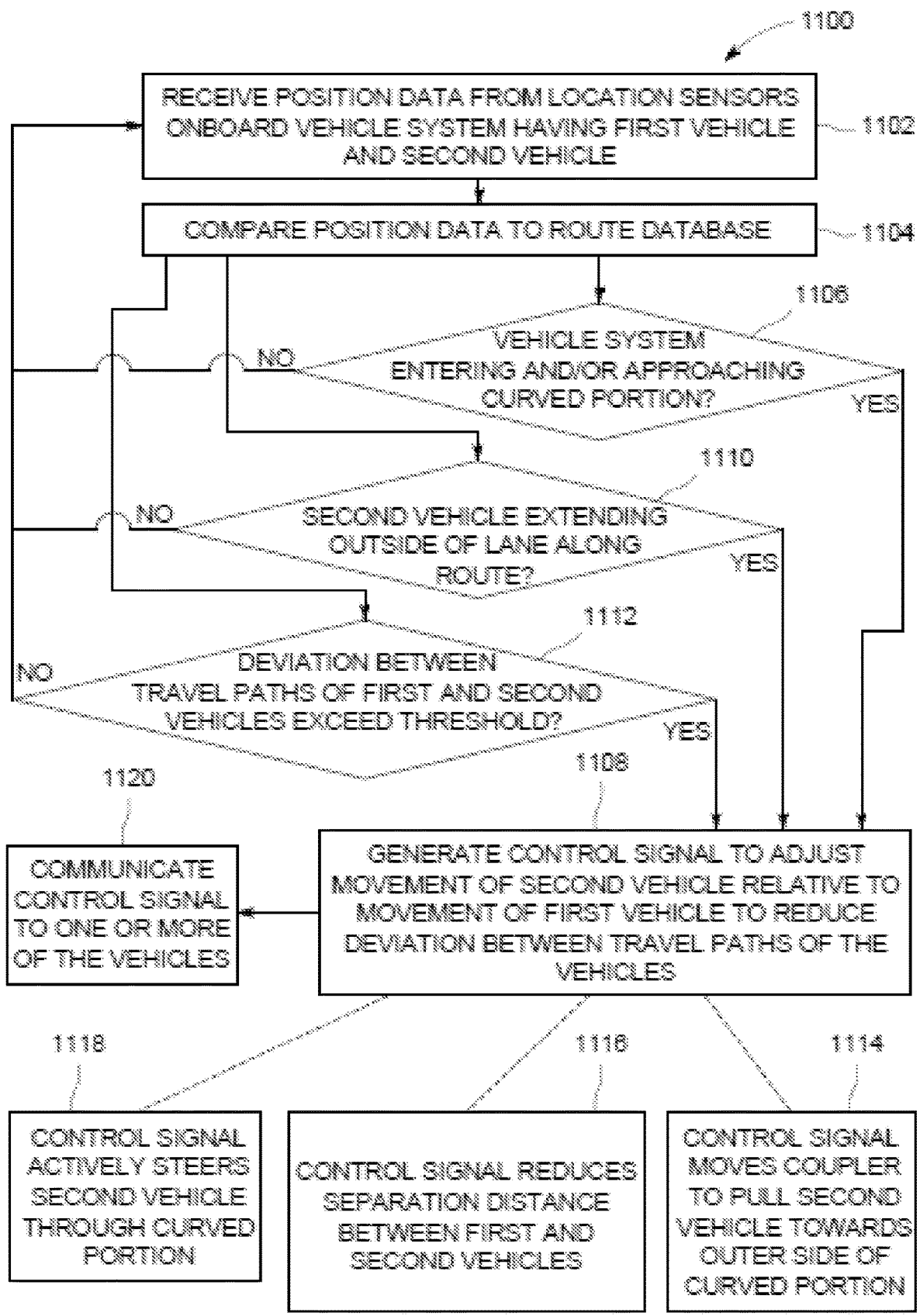
FIG. 13 illustrates a flow chart of a method of controlling a vehicle system, according to an embodiment of the disclosure.

FIG. 13 illustrates a flow chart of a method 1100 of controlling a vehicle system, according to an embodiment of the disclosure. The handling unit may operate according to the flow chart shown in FIG. 13.

At step 1102, position data is received from location sensors disposed onboard a vehicle system that has multiple vehicles, including a first vehicle and a second vehicle. The first vehicle and the second vehicle are arranged in a line with the first vehicle located closer to a first end of the vehicle system than the second vehicle. For example, the vehicle system may be one of the vehicle systems described herein. The second vehicle may be coupled to the first vehicle. The vehicles may move together along the route via coordinated movements, either mechanically aided and/or enabled by wireless communications. The location sensors may be GPS units, RFID units, proximity sensors, laser range sensors, or the like. The position data may be indicative of a location of the vehicles along the route.

At step 1104, the position data that is received may be compared to a map or route database. The route database may be stored on a memory. The route database may include locations or coordinates of known curved portions along the route, and may include properties or characteristics of the curved portions (e.g., radius of curvature, length of the curve, grade, tilt, and the like).

At step 1106, it is determined whether the vehicles of the vehicle system are entering and/or approaching a curved portion along the route. For example, the handling unit may determine that the vehicles are entering and/or approaching a curved portion responsive to the position data indicating that the vehicle system is proximate to one of the locations of the known curved portions stored in the route database. Optionally, operation of the vehicle itself may indicate that a turn or curve is appropriate. If it is determined that the vehicle system is entering and/or approaching a curved portion of the route then flow proceeds to step 1108, and a control signal is generated to change or adjust movement of the second vehicle relative to movement of the first vehicle. This may be done to reduce deviation distance between travel paths of the first and second vehicles as the vehicle system travels through the curved portion. If, on the other hand, it is determined that the vehicle system is not entering and/or approaching a curved portion, then flow returns to step 1102 and additional position data is received.

At step 1110, it is determined whether the second vehicle extends, or may extend, outside of a designated lane along the route. For example, the handling unit may compare the position data to other data in the route database to determine the relative position of the second vehicle within a designated lane along the route. For routes that are roads, the designated lane may be one of multiple lanes in the road demarcated by parallel lines. The position data may be used to determine if the second vehicle crosses or will cross any of the lane lines, thereby extending into another lane or a shoulder of the road. If it is determined that the second vehicle does or will indeed extend outside of the designated lane, then flow proceeds to step 1108 and the control signal is generated to adjust the movement of the second vehicle as described above.

At step 1112, it is determined whether a deviation distance between a travel path of the first vehicle and a respective travel path of the second vehicle exceeds a designated threshold. For example, both the first vehicle and the second vehicle may include location sensors disposed onboard the vehicles. The handling unit may compare the position data from the location sensor onboard to the first vehicle to the position date from the location sensor onboard the second vehicle to determine a lateral deviation distance between the vehicles. For example, the travel path of the first vehicle may represent a trajectory of a center or mid-point of the first vehicle along the curved portion, and the travel path of the second vehicle likewise represents a trajectory of a center or mid-point of the second vehicle. The designated threshold may be selected by an operator. If it is determined that the deviation distance between the travel paths of the first and second vehicles exceeds the designated threshold, then flow proceeds to 1108 and the control signal is generated to adjust the movement of the second vehicle as described above.

The control signal may adjust the movement of the second vehicle relative to the movement of the first vehicle in various ways. For example, at step 1114, the control signal may cause the movement of a coupler that mechanically couples the first vehicle to the second vehicle. The movement may modify an angular orientation of the coupler such that the second vehicle is pulled more towards an outer side of the curved portion of the route as the vehicle system travels through the curved portion than the second vehicle would be pulled by not moving the coupler. For example, the coupler may be moved by laterally moving a hitch that is mounted to the first vehicle and/or by laterally moving a hitch that is mounted to the second vehicle. The hitch mounted to the first vehicle may be moved laterally towards the outer side of the curved portion. The hitch mounted to the second vehicle may be moved laterally towards an inner side of the curved portion. Moving the coupler may allow the second vehicle to more closely align with the travel path of the first vehicle through the curved portion.

At step 1116, the control signal may reduce a separation distance between the two vehicles. For example, the control signal may increase a propulsive force generated by a traction system of the second vehicle relative to forces generated by a traction system of the first vehicle to increase the speed of the second vehicle relative to the first vehicle. Alternatively or additionally, the control signal may slow the first vehicle earlier or to a greater extent than the second vehicle is slowed upon approaching the curved portion to reduce the separation distance. Reducing the separation distance may allow the second vehicle to more closely align with the travel path of the first vehicle through the curved portion.

At step 1118, the control signal may actively steer the second vehicle through the curved portion. For example, the control signal may modify the steering of the second vehicle relative to the steering of the first vehicle, and may allow the second vehicle two more closely align with the travel path of the first vehicle through the curved portion of the route.

After generating the control signal, the control signal is communicated to one or more of the vehicles of the vehicle system at step 1120. The vehicles may implement the control signal, resulting in a reduced deviation distance between the travel paths of the first and second vehicles along the curved portion.

Referring to FIGS. 1-13, certain embodiments of the disclosure provide a system that may include a vehicle system including a plurality of vehicles. The vehicles may travel along a route. A plurality of location determination devices may be onboard the vehicle system. One or more of the plurality of location determination devices may output position data regarding a location of at least one of the plurality of vehicles. A handling unit is in communication with the plurality of location determination devices. The handling unit may receive the position data from the plurality of location determination devices and control separation distances between the plurality of vehicles based on the position data. A first one of the plurality of location determination devices may be onboard a first one of the plurality of vehicles, and a second one of the plurality location determination devices may be onboard a second one of the plurality of vehicles. In one embodiment, a respective one of the plurality of location determination devices may be onboard a respective one of the plurality of vehicles.

At least one of the location determination devices may include a global positioning system (GPS) device. In one embodiment, at least one of the plurality of location determination devices may include a radio frequency identification (RFI) device. At least one of the plurality of location determination devices may be mounted to at least a portion of at least one of the plurality of vehicles. At least one of the plurality of location determination devices may be secured to an external device that is onboard at least one of the plurality of vehicles. In one embodiment, the handling unit is onboard at least one of the plurality of vehicles. In one embodiment, the handling unit is remotely located from the vehicle system.

The system may include a route guidance unit in communication with the handling unit. The handling unit may adjust separation distances between the plurality of vehicles based on features of the route as determined by the route guidance unit. The handling unit may control at least two of the plurality of vehicles as the vehicle system travels through a curved portion of the route. The handling unit may be configured to maintain one or more of the separation distances within a determined safe separation range. The determined safe separation range may be between a lower safe separation distance threshold and an upper safe separation distance threshold.

Certain embodiments of the disclosure provide a method that may include operating a vehicle system including a plurality of vehicles along a route, receiving, by a handling unit, position data regarding the plurality of vehicles from a plurality of location determination devices onboard the vehicle system, and controlling, by the handling unit, separation distances between the plurality of vehicles based on the position data. The method may include positioning a first one of the plurality of location determination devices onboard a first one of the plurality of vehicles, and positioning a second one of the plurality location determination devices onboard a second one of the plurality of vehicles. The method may include positioning a respective one of the plurality of location determination devices onboard a respective one of the plurality of vehicles.

The method may include mounting at least one of the plurality of location determination devices on at least a portion of at least one of the plurality of vehicles. The method may include securing at least one of the plurality of location determination devices to a remote device that is onboard at least one of the plurality of vehicles. In one embodiment, the method may include disposing the handling unit onboard at least one of the plurality of vehicles. In one embodiment, the method may include remotely locating the handling unit from the vehicle system.

The method may include adjusting, with the handling unit, separation distances between the plurality of vehicles based on features of the route as determined by a route guidance unit that is in communication with the handling unit. The method may include using the handling unit to control at least two of the plurality of vehicles as the vehicle system travels through a curved portion of the route. The method may include using the handling unit to maintain one or more of the separation distances within a determined safe separation range. The determined safe separation range may be between a lower safe separation distance threshold and an upper safe separation distance threshold.

Certain embodiments of the disclosure provide a system that includes a vehicle system including a plurality of vehicles. The vehicle system may travel along a route. A handling unit may control at least two of the plurality of vehicles as the vehicle system travels through a curved portion of the route. Certain embodiments of the disclosure provide a method that includes operating a vehicle system including a plurality of vehicles along a route, and using a handling unit to control at least two of the plurality of vehicles as the vehicle system travels through a curved portion of the route.

Certain embodiments of the disclosure provide a vehicle control system and method that determine a current slack state of a multi-vehicle system while the multi-vehicle system is in a stationary state on a grade. The current slack state indicates one or more groups of the vehicles being bunched together or stretched apart. Brake systems and/or propulsion systems of the vehicles can be individually controlled to change the current slack state to a designated slack state while transitioning from the stationary state to a moving state. Identifying the slack state of the multi-vehicle system prior to transitioning from the stationary state to the moving state provides information necessary to control one or more vehicles of the multi-vehicle system to avoid breaking the multi-vehicle system when parked uphill and bunched, and to avoid run-in when parked downhill and stretched. Certain embodiments of the disclosure can include vehicle systems with slack states that can be comprised of partially stretched and/or partially bunched vehicles or groups of vehicles. Certain embodiments of the disclosure can include vehicle systems with more than one vehicle directed to generate propulsion. The controller can identify the slack states of the vehicles or vehicle groups and control the movements of the vehicles or groups of vehicles to avoid uncontrolled run-in or roll-out in the vehicle systems.

Certain embodiments of the disclosure can include a multi-vehicle system with a plurality of braking systems. Certain embodiments of the disclosure can include a multi-vehicle system with a single braking system. The braking system can be located at the end of a vehicle system. The end of the vehicle system can be a non-propulsion vehicle, or a vehicle directed by the controller to generate propulsion. Certain embodiments of the disclosure can include brakes that are electronically controlled pneumatic (ECP) brakes, for immediate reactions in response to controller commands.

Figure 14:
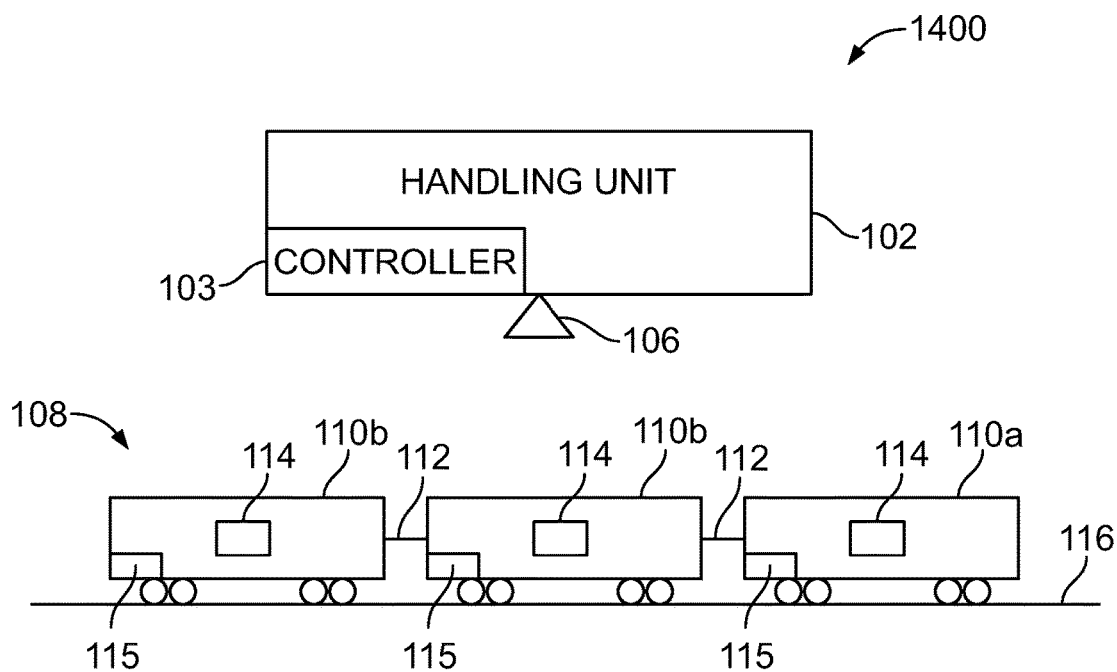
FIG. 14 illustrates a schematic diagram of one example of a vehicle control system, according to an embodiment of the disclosure.

FIG. 14 illustrates a schematic diagram of one example of a vehicle control system 1400. The vehicle control system may include the handling unit 102 described above. Additionally, the handling unit includes or is coupled to the communication device 106 that is described above. In one embodiment, the handling unit may be onboard one of the vehicles 110a, 110b of the multi-vehicle system 108 as described above. Alternatively, the handling unit may be at a location that is remote, separate, and distinct from the multi-vehicle system. For example, the handling unit may be located at a monitoring station that is off-board and in communication with the multi-vehicle system. Additionally, one or more of the vehicles can include a location determination device 114, as described above. One or more traction systems 115 may also be provided as described above to propel the multi-vehicle system along one or more routes 116.

The controller can determine that the multi-vehicle system is stationary (e.g., stopped or otherwise parked) on an uphill grade. The controller can determine a slack condition of the multi-vehicle system to take precautions to avoid damage to the multi-vehicle system as the vehicle system starts moving from the stationary state. For example, if the multi-vehicle system is entirely or partially in a bunched state, the controller can direct brakes of one or more of the vehicles to release in a controlled order or sequence to prevent the vehicle system from breaking apart. This controlled order or release may release some, but not all, of the brakes as movement of the vehicle system on the grade begins. Releasing the brakes of all vehicles in the multi-vehicle system simultaneously could cause an uncontrolled roll-out. The uncontrolled roll-out occurs as the rear vehicles of the multi-vehicle system roll backward down the grade, potentially breaking the multi-vehicle system when the front of the multi-vehicle system starts moving up the grade. Responsive to the controller determining that the slack condition of the vehicle system is a bunched state and the multi-vehicle system is stationary on an inclined grade, the controller can control the movement of the multi-vehicle system. The controller can control the movement of the multi-vehicle system by controlling the brakes of one or more vehicles of the multi-vehicle system. The controller can direct the brakes of one or more vehicles of the multi-vehicle system to continue providing at least some braking effort in one or more uphill vehicles in the multi-vehicle system to cause a controlled roll-out of one or more downhill vehicles in the multi-vehicle system away from the one or more uphill vehicles. In an embodiment, the controlled roll-out can result from the brakes of the one or more downhill vehicles being released prior to releasing the brakes and any forward movement of uphill vehicles. In another embodiment, the controlled roll-out results from the brakes of the one or more downhill vehicles being released sequentially (and before the brakes in one or more uphill vehicles are released) to proceed up the uphill grade and gradually change the bunched state of the multi-vehicle system to a stretched state.

In response to the controller determining that the multi-vehicle system is stationary on a downhill grade, the controller may take precautions to avoid a run-in that would damage the multi-vehicle system. For example, simultaneously releasing the brakes of all vehicles in an entirely or partially stretched multi-vehicle system parked on a downhill grade could cause the rear or uphill vehicles in the multi-vehicle system to roll forward. The forward movement can cause an uncontrolled and damaging run-in. The uncontrolled run-in occurs as the uphill vehicles of the multi-vehicle system roll downhill and potentially collide with the downhill vehicles of the multi-vehicle system. The controller can control the movement of the multi-vehicle system by controlling the brakes of the vehicles in the multi-vehicle system. The controller can direct the brakes of the vehicles in the multi-vehicle system to continue providing at least some braking effort in one or more downhill vehicles in the multi-vehicle system. The braking effort can be used to cause a controlled roll-in of one or more uphill vehicles in the multi-vehicle system toward the one or more downhill vehicles. In an embodiment, the controlled roll-in can result from the brakes of the one or more uphill vehicles being released prior to releasing the brakes and any forward movement of downhill propulsion vehicles. In another embodiment, the controlled roll-in can result from the brakes of the one or more uphill vehicles being released sequentially in an order to proceed down the downhill grade to gradually create a slack state of the multi-vehicle system that corresponds to a bunched state.

Figure 15:
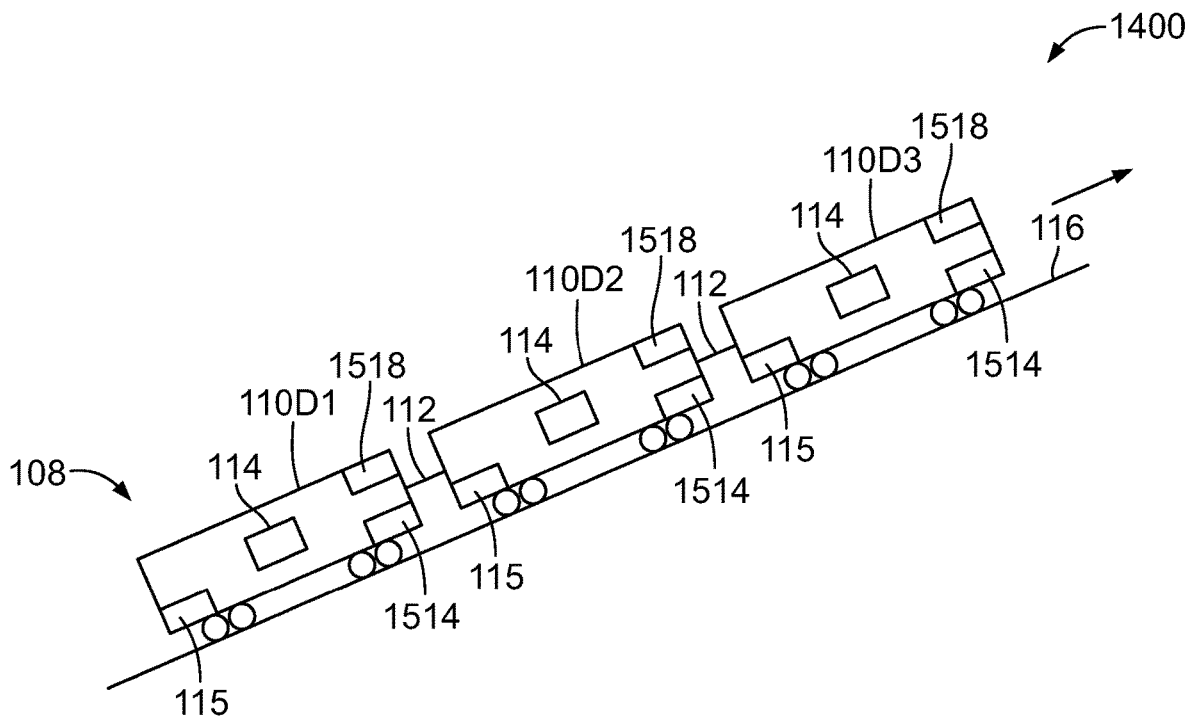
FIG. 15 illustrates a schematic diagram of one example of a vehicle system on an incline.

FIG. 15 illustrates a schematic diagram of one example of a vehicle system 1400 on an inclined grade, according to an embodiment. The one or more processors in the controller 103 may determine whether the multi-vehicle system 108 is parked, stopped, stationary, or the like, on an inclined grade. In order to make such a determination, the controller can include or be communicatively coupled to a grade sensor 1514, such as an inclinometer, tilt sensor, a Hall effect sensor, a global positioning system (GPS) receiver (used with a route database that associates different grades with different locations), or operator/user input. The grade sensor can detect and/or measure an angle of incline (or decline) and provide an output that can be expressed as an angle in degrees, an indicator light, a display, or the like. The controller can also include or be communicatively coupled with a movement sensor 1518 to measure the movement status of the vehicle system. The movement sensor can be a GPS unit (used to track the direction and/or speed of the vehicle system via satellite), a tachometer, operator input, or the like. The controller may also be communicatively coupled to one or more of the location sensors 114, described above. The one or more processors of the controller can use the output of the one or more location sensors can be disposed onboard different vehicles in the multi-vehicle system to determine the slack condition of the multi-vehicle system. Further, the controller can determine that the slack condition of the multi-vehicle system is a bunched state while the multi-vehicle system is parked, stationary, stopped, or the like, on an inclined grade. The controller can determine the slack condition by receiving the outputs from the movement and grade sensors that can indicate that the vehicle system is not moving and is on an incline. In addition, location sensors can indicate that one or more vehicles of the vehicle system are at a distance that falls within a designated range that correlates to a bunched state. The bunched state occurs when the distance between vehicles is shorter than a threshold distance. For example, the total amount of slack between one or more vehicles of a vehicle system can be up to four feet. A bunched state can occur when the distance between two or more vehicles of the vehicle system is less than two feet.

The controller can control the movement of the multi-vehicle system starting from a stationary state and while on the incline by controlling the brakes of the multi-vehicle system. A braking effort may be applied in a manner to cause a controlled roll-out of one or more downhill vehicles in the multi-vehicle system away from the one or more uphill vehicles. Subject to one or more designated vehicle movement limits, the controller can direct an uphill vehicle in the vehicle system to maintain braking effort while the downhill vehicles can be directed to apply less braking effort, allowing some movement. For example, downhill vehicles can be directed by the controller to apply less braking effort to allow a roll-out of the downhill vehicles. The roll-out can increase the distance between two or more vehicles of the multi-vehicle system to a designated distance between downhill vehicles. The movement of the uphill vehicles is slowed or not allowed until the downhill vehicles reach a designated distance from each other.

The one or more designated vehicle movement limits may include one or more vehicle speed and/or acceleration thresholds. The controller can dictate how brakes of various downhill vehicles are released to keep the downhill movement of those downhill vehicles within the designated movement limits. For example, the controller can direct a first downhill vehicle 110D1 to fully release brakes of the first downhill vehicle, a second downhill vehicle 110D2 that is uphill of the first downhill vehicle to partially release brakes, and a downhill vehicle 110D3 to not release brakes. This can cause the first and second downhill vehicles to roll down the grade but not faster than an upper speed limit of descent. Optionally, the controller can monitor how rapidly the downhill vehicles are moving down the grade and, responsive to one or more of the downhill vehicles moving down the grade faster than the upper speed limit, the controller can direct one or more of those downhill vehicles to at least partially apply brakes. Optionally, the controller can direct one or more propulsion vehicles to slow downhill movement. For example, the propulsion vehicle of the multi-vehicle system can be 110D3. The controller can direct downhill vehicle 110D3 to reduce throttle to slow the multi-vehicle system down to a speed within the upper and lower designated limits for vehicle speed from a current speed.

The upper acceleration threshold can be a limit on how rapidly the controller will permit a downhill vehicle to accelerate down the grade before directing one or more of the downhill vehicles to engage brakes. The controller can dictate how brakes of various downhill vehicles are released to keep the downhill movement of those downhill vehicles within the designated movement limits. For example, the controller can direct a first downhill vehicle 110D1 to fully release brakes of the first downhill vehicle, a second downhill vehicle 110D2 that is uphill of the first downhill vehicle to partially release brakes, and a downhill vehicle 110D3 to not release brakes. This can cause the first and second downhill vehicles to roll down the grade but not faster than an upper acceleration limit of descent. Optionally, the controller can monitor how rapidly the downhill vehicles accelerate down the grade and, responsive to one or more of the downhill vehicles accelerating down the grade faster than the upper acceleration limit, the controller can direct one or more of those downhill vehicles to at least partially apply brakes. Optionally, the controller can direct one or more propulsion vehicles to slow downhill movement. For example, the propulsion vehicle of the multi-vehicle system can be 110D3. The controller can direct downhill vehicle 110D3 to decrease acceleration of the multi-vehicle system within the upper and lower designated limits for vehicle acceleration from a current acceleration rate.

Optionally, the controller can apply different speed and acceleration thresholds to each vehicle in the vehicle system, according to one or more designated vehicle movement limits. Additionally or alternatively, the controller may be configured to control the brake system by sequentially releasing brakes of the downhill vehicles in an order to proceed up the inclined grade. For example, a multi-vehicle system can be stationary on an inclined route. The vehicle system can be stationary because of an impediment detected on the route. The downhill vehicles can be at the opposite end from the propulsion end of the vehicle system. The controller can determine based on outputs from the location, grade, and movement sensors that the multi-vehicle system is stationary on an inclined route and that one or more vehicles of the vehicle system are in a bunched state. The controller can direct the downhill vehicles to sequentially release the brakes of the vehicle starting with the downhill vehicles and proceeding with uphill vehicles prior to forward motion of one or more uphill propulsion vehicles. Additionally or alternatively, the controller may be configured to gradually release brakes of the one or more downhill vehicles. For example, a controller can determine that a multi-vehicle system is stationary, at an incline, and bunched at a location along a route. The controller can base the determination on output from various sensors onboard the vehicle, such as location, movement, and grade sensors. The controller can direct the brakes of multiple downhill vehicles of the multi-vehicle system to gradually release the brakes prior to the forward motion of the uphill propulsion vehicles of the multi-vehicle system.

The thresholds may be absolute or relative to one or more other vehicles in the multi-vehicle system that would avoid causing inter-vehicle forces to exceed a threshold. An absolute threshold can be a numeric value that does not vary based on the operation or movement of other vehicles. A relative threshold can be a threshold that changes values based on the operation or movement of other vehicles. For example, an absolute threshold can be a designated speed value or designated acceleration value that does not change regardless of the movement of other vehicles. A relative threshold can be a designated speed difference or acceleration difference from the speed or acceleration of another vehicle. For example, a relative speed threshold may be the difference in speeds in which first and second adjacent vehicles move down the grade cannot exceed the threshold. As another example, a relative acceleration threshold may be the difference in accelerations in which first and second adjacent vehicles move down the grade cannot exceed the threshold.

In operation, the controller 103 detects the multi-vehicle system condition by analyzing outputs from various sensors, such as grade sensors 1514, location sensors 114, and movement sensors 1518. For example, the multi-vehicle system condition can be represented by the slack condition, whether the vehicle system is stationary, whether the vehicle system is on a grade, and/or the direction of the vehicle system if the vehicle is on a grade. In FIG. 15, the one or more processors determine that the multi-vehicle system is stationary, on an incline, and has one or more vehicles in a bunched slack state. Based on the multi-vehicle system condition, the controller can direct the vehicle to perform a controlled roll-out prior and/or during to the forward movement of the propulsion vehicles of the multi-vehicle system.

For example, the controller can direct the brakes of the multi-vehicle system to release in a sequential manner. The sequential manner of releasing the brakes can occur with one or more of the furthest downhill vehicles of multi-vehicle system releasing the brakes first, followed by the next one or more uphill vehicles of multi-vehicle system releasing the brakes next, and so on in an order progressing up the incline. This sequential releasing of the brakes up the incline in the multi-vehicle system can continue until a designated slack state is achieved. In the illustrated example, the designated slate state can be a stretched slack state in one or more segments of the multi-vehicle system. Upon achieving the designated slack state, the controller can direct one or more vehicles to propel the multi-vehicle system up the incline.

In another example, the sequential manner of changing the slack state can occur when a first downhill group of vehicles releases brakes first, followed by the next group of one or more uphill vehicles of multi-vehicle system releasing the brakes next, and so on in an order progressing up the incline. This sequential releasing of the brakes up the incline in the multi-vehicle system can continue until a designated slack state is achieved. In the illustrated example, the designated slate state can be a stretched slack state in one or more segments of the multi-vehicle system. Upon achieving the designated slack state, the controller can direct one or more vehicles to propel the multi-vehicle system up the incline.

In another example, the controller can direct the individual vehicles or group of vehicles to release the brakes all at once. The brakes can be fully engaged until the controller directs the brakes to fully release.

In another example, the controller can direct the individual vehicles or group of vehicles to release the brakes gradually. For example, the controller can direct a brake to be released in a gradual manner, such that the braking effort decreases with respect to time until the brake is fully released. The controller can direct the gradual release of the brakes in this manner with respect to time for each vehicle or group of vehicles in an order progressing up the incline until the roll-out is complete and the designated slack state is achieved.

In another example, the controller can direct one or more vehicles to propel the multi-vehicle system to achieve roll-out and a designated slack state. For example, the controller can direct one or more of the uphill vehicles to generate propulsion up the incline while one or more downhill vehicles release brakes. The controller can direct the one or more of the uphill vehicles to generate propulsion up the incline until the roll-out is complete and the designated slack state is achieved.

In another example, the controller can direct one or more vehicles to propel the multi-vehicle system to achieve roll-out and a designated slack state. For example, one or more downhill vehicles can be oriented in an opposite direction than the uphill vehicles, facing in a downhill direction down the decline. The controller can direct one or more of the downhill vehicles to generate propulsion down the decline while one or more other downhill vehicles release brakes. This operation can stretch the vehicle system to achieve the designated slack slate. The controller can direct the one or more of the downhill vehicles to generate propulsion down the decline until the roll-out is complete and the designated slack state is achieved.

Once the roll-out is complete and the designated slack state is achieved, the vehicle system can proceed up the incline.

Figure 16:
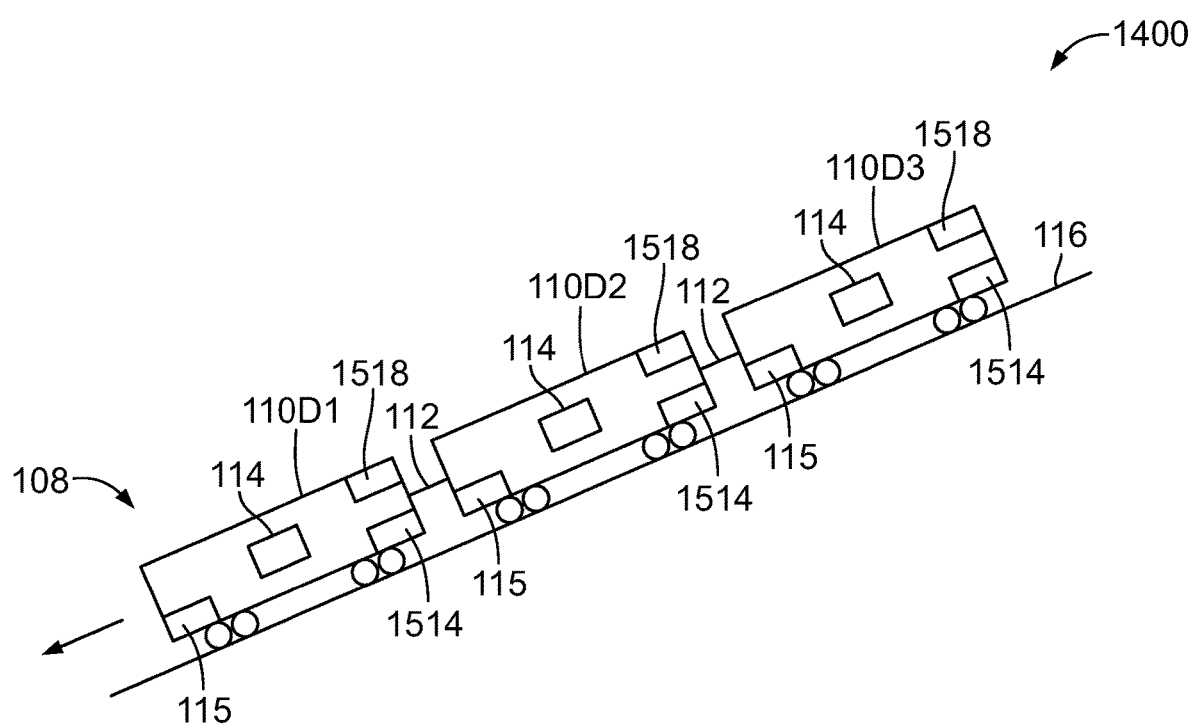
FIG. 16 illustrates a schematic diagram of one example of a vehicle system on a decline.

FIG. 16 illustrates a schematic diagram of one example of a vehicle system 1400 on a declined grade, according to an embodiment. The one or more processors in the controller 103 may determine whether the multi-vehicle system 108 is parked, stopped, stationary, or the like, on a downhill grade. In order to make such a determination, the controller can include or be communicatively coupled to a grade sensor 1514, such as an inclinometer, tilt sensor, a Hall effect sensor, a global positioning system (GPS) receiver (used with a route database that associates different grades with different locations), or operator/user input. The grade sensor can detect and/or measure an angle of or decline and provide an output that can be expressed as an angle in degrees, an indicator light, a display, or the like. The controller can also include or be communicatively coupled with a movement sensor 1518 to measure the movement status of the vehicle system. The movement sensor can be a GPS unit (used to track the direction and/or speed of the vehicle system via satellite), a tachometer, operator input, or the like. The controller may also be communicatively coupled to one or more of the location sensors 114, described above. The one or more processors of the controller can use the output of the one or more location sensors can be disposed onboard different vehicles in the multi-vehicle system to determine the slack condition of the multi-vehicle system. Further, the controller can determine that the slack condition of the multi-vehicle system is a stretched state while the multi-vehicle system is parked, stationary, stopped, or the like, on a downhill grade. The controller can determine the slack condition by receiving the outputs from the movement and grade sensors that can indicate that the vehicle system is not moving and is on a decline. The location sensors can indicate that one or more vehicles are at a distance from each other that is within a threshold distance. In addition, location sensors can indicate that one or more vehicles of the vehicle system are at a distance that falls within a designated range that correlates to a stretched state. The stretched state occurs when the distance between vehicles is longer than a threshold distance. For example, the total amount of slack between one or more vehicles of a vehicle system can be up to four feet. A stretched state can occur when the distance between two or more vehicles of the vehicle system is more than three feet.

The controller can control the movement of the multi-vehicle system starting from a stationary state and while on the decline by controlling the brakes of the multi-vehicle system. A braking effort may be applied in a manner to cause a controlled run-in of one or more uphill vehicles in the multi-vehicle system toward the one or more downhill vehicles. Subject to one or more designated vehicle movement limits, the controller can direct a downhill vehicle in the vehicle system to maintain braking effort while the uphill vehicles can be directed to apply less braking effort, allowing some movement. For example, uphill vehicles directed by the controller to apply less braking effort can allow a run-in of the uphill vehicle. The run-in can decrease the distance between two or more vehicles of the multi-vehicle system to a designated distance between uphill vehicles. The movement of the downhill vehicles is slowed or not allowed until the uphill vehicles reach a designated distance from each other.

The one or more designated vehicle movement limits may include one or more vehicle speed or acceleration thresholds. The controller can dictate how brakes of various uphill vehicles are released to keep the downhill movement of those uphill vehicles within the designated movement limits. For example, the controller can direct a first uphill vehicle 110D3 to fully release brakes of the first uphill vehicle, a second uphill vehicle 110D2 that is downhill of the first uphill vehicle to partially release brakes, and a downhill vehicle 110D1 to not release brakes. This can cause the first and second uphill vehicles to roll down the grade but not faster than an upper speed limit of descent. Optionally, the controller can monitor how rapidly the uphill vehicles are moving down the grade and, responsive to one or more of the uphill vehicles moving down the grade faster than the upper speed limit, the controller can direct one or more of those uphill vehicles to at least partially apply brakes.

The upper acceleration threshold can be a limit on how rapidly the controller will permit an uphill vehicle to accelerate down the grade before directing one or more of the uphill vehicles to engage brakes. The controller can dictate how brakes of various uphill vehicles are released to keep the downhill movement of those uphill vehicles within the designated movement limits. For example, the controller can direct a first uphill vehicle 110D3 to fully release brakes of the first uphill vehicle, a second uphill vehicle 110D2 that is downhill of the first uphill vehicle to partially release brakes, and an uphill vehicle 110D1 to not release brakes. This can cause the first and second uphill vehicles to roll down the grade but not faster than an upper acceleration limit of descent. Optionally, the controller can monitor how rapidly the uphill vehicles accelerate down the grade and, responsive to one or more of the uphill vehicles accelerating down the grade faster than the upper acceleration limit, the controller can direct one or more of those uphill vehicles to at least partially apply brakes. Optionally, the controller can direct one or more propulsion vehicles to slow downhill movement. For example, the propulsion vehicle of the multi-vehicle system can be 110D1. The controller can direct downhill vehicle 110D1 to decrease acceleration of the multi-vehicle system within the upper and lower designated limits for vehicle acceleration from a current acceleration rate.

Optionally, the controller can apply different speed and acceleration thresholds to each vehicle in the vehicle system. according to one or more designated vehicle movement limits. Additionally or alternatively, the controller may be configured to control the brake system by sequentially releasing brakes of the downhill vehicles in an order to proceed up the inclined grade. For example, a multi-vehicle system can be stationary on a declined route. The uphill vehicles can be at the opposite end from vehicle that are directed to generate propulsion. The controller can determine based on outputs from the location, grade, and movement sensors that the multi-vehicle system is stationary, is on a downhill grade, and one or more vehicles of the vehicle system are in a stretched state. The controller can direct the uphill vehicles to sequentially release the brakes of the vehicle starting with the uphill vehicles and proceeding with downhill vehicles prior to forward motion of one or more vehicles directed by the controller to generate propulsion. Additionally or alternatively, the controller may be configured to gradually release brakes of the one or more uphill vehicles. For example, a controller can determine that a multi-vehicle system is stationary, at a decline, and stretched at a location along a route. The controller can base the determination on output from various sensors onboard the vehicle, such as location, movement, and grade sensors. The controller can direct the brakes of multiple uphill vehicles of the multi-vehicle system to gradually release the brakes prior to the forward motion of the downhill propulsion vehicles of the multi-vehicle system.

The thresholds may be absolute or relative to one or more other vehicles in the multi-vehicle system that would avoid causing inter-vehicle forces to exceed a threshold. An absolute threshold can be a numeric value that does not vary based on the operation or movement of other vehicles. A relative threshold can be a threshold that changes values based on the operation or movement of other vehicles. For example, an absolute threshold can be a designated speed value or designated acceleration value that does not change regardless of the movement of other vehicles. A relative threshold can be a designated speed difference or acceleration difference from the speed or acceleration of another vehicle. For example, a relative speed threshold may be the difference in speeds in which first and second adjacent vehicles move up the grade cannot exceed the threshold. As another example, a relative acceleration threshold may be the difference in accelerations in which first and second adjacent vehicles move up the grade cannot exceed the threshold.

In operation, the controller 103 detects the multi-vehicle system condition by analyzing outputs from various sensors, such as grade sensors 1514, location sensors 114, and movement sensors 1518. For example, the multi-vehicle system condition can be the slack condition, whether the vehicle is stationary, whether the vehicle is on a grade, and the direction of the vehicle if the vehicle is on a grade. In FIG. 15, the one or more processors determine that the multi-vehicle system is stationary, on a decline, and has one or more vehicles in a stretched slack state. Based on the multi-vehicle system condition, the controller can direct the vehicle to perform a controlled run-in prior and/or during to the forward movement of the propulsion vehicles of the multi-vehicle system.

For example, the controller can direct the brakes of the multi-vehicle system to release in a sequential manner. The sequential manner of releasing the brakes can occur with one or more of the furthest uphill vehicles of multi-vehicle system releasing the brakes first, followed by the next one or more downhill vehicles of multi-vehicle system releasing the brakes next, and so on in an order progressing down the decline. This sequential releasing of the brakes down the incline in the multi-vehicle system can continue until a designated slack state is achieved. In the illustrated example, the designated slate state can be a bunched slack state in one or more segments of the multi-vehicle system. Upon achieving the designated slack state, the controller can direct one or more vehicles to propel the multi-vehicle system down the decline.

In another example, the sequential manner of changing the slack state can occur when a first uphill group of vehicles releases brakes first, followed by the next group of one or more downhill vehicles of multi-vehicle system releasing the brakes next, and so on in an order progressing down the decline. This sequential releasing of the brakes down the decline in the multi-vehicle system can continue until a designated slack state is achieved. In the illustrated example, the designated slate state can be a bunched slack state in one or more segments of the multi-vehicle system. Upon achieving the designated slack state, the controller can direct one or more vehicles to propel the multi-vehicle system down the decline.

In another example, the controller can direct the individual vehicles or group of vehicles to release the brakes all at once. The brakes can be fully engaged until the controller directs the brakes to fully release.

In another example, the controller can direct the individual vehicles or group of vehicles to release the brakes gradually. For example, the controller can direct a brake to be released in a gradual manner, such that the braking effort decreases with respect to time until the brake is fully released. The controller can direct the gradual release of the brakes in this manner with respect to time for each vehicle or group of vehicles in an order progressing down the decline until the run-in is complete and the designated slack state is achieved.

In another example, the controller can direct one or more vehicles to propel the multi-vehicle system to achieve roll-out and a designated slack state. For example, the controller can direct one or more of the downhill vehicles to generate propulsion down the decline while one or more uphill vehicles release brakes. The controller can direct the one or more of the downhill vehicles to generate propulsion down the decline until the run-in is complete and the designated slack state is achieved.

In another example, the controller can direct one or more vehicles to propel the multi-vehicle system to achieve run-in and a designated slack state. For example, one or more uphill vehicles can be oriented in an opposite direction than the downhill vehicles, facing in an uphill direction up the incline. The controller can direct one or more of the uphill vehicles to generate propulsion up the incline while one or more other uphill vehicles release brakes. This operation can bunch the vehicle system to achieve the designated slack slate. The controller can direct the one or more of the uphill vehicles to generate propulsion up the incline until the run-in is complete and the designated slack state is achieved.

Once the run-in is complete and the designated slack state is achieved, the vehicle system can proceed down the decline.

Prior to and/or during run-in and roll-out operations, thresholds can be established to limit vehicle movement. The thresholds can be absolute or relative to one or more other vehicles in the multi-vehicle system that would avoid causing inter-vehicle forces to exceed a threshold. An absolute threshold can be a designated speed value or designated acceleration value that does not change regardless of the movement of other vehicles. A relative threshold can be a designated speed difference or acceleration difference from the speed or acceleration of another vehicle. For example, during run-in operations, the controller can direct one or more vehicles to adjust braking and/or propulsion to keep the vehicle speed and/or acceleration within absolute or relative limits. For example, the controller can determine that the vehicle system is stationary on a declined grade with a stretched vehicle state. The controller can control braking and acceleration limits of the vehicle to maintain vehicle movement within absolute thresholds, such as designated upper and lower speeds and/or acceleration down a declined grade. The controller can also control braking and acceleration limits of the vehicle to maintain vehicle movement within relative thresholds, such as upper and lower speeds and/or accelerations relative to other vehicles proceeding down a declined grade. On the other hand, during roll-out operations, the controller can direct braking and/or propulsion to keep the vehicle speed and/or acceleration within absolute or relative limits. For example, the controller can identify that the vehicle system is stationary on an inclined grade with a bunched vehicle state. The controller can control braking and acceleration limits of the vehicle to maintain vehicle movement within absolute thresholds, such as designated upper and lower speeds and/or accelerations. The controller can also control braking and acceleration limits of the vehicle to maintain vehicle movement within relative thresholds, such as designated upper and lower speeds and/or accelerations relative to other vehicles proceeding up an inclined grade.

Figure 17:
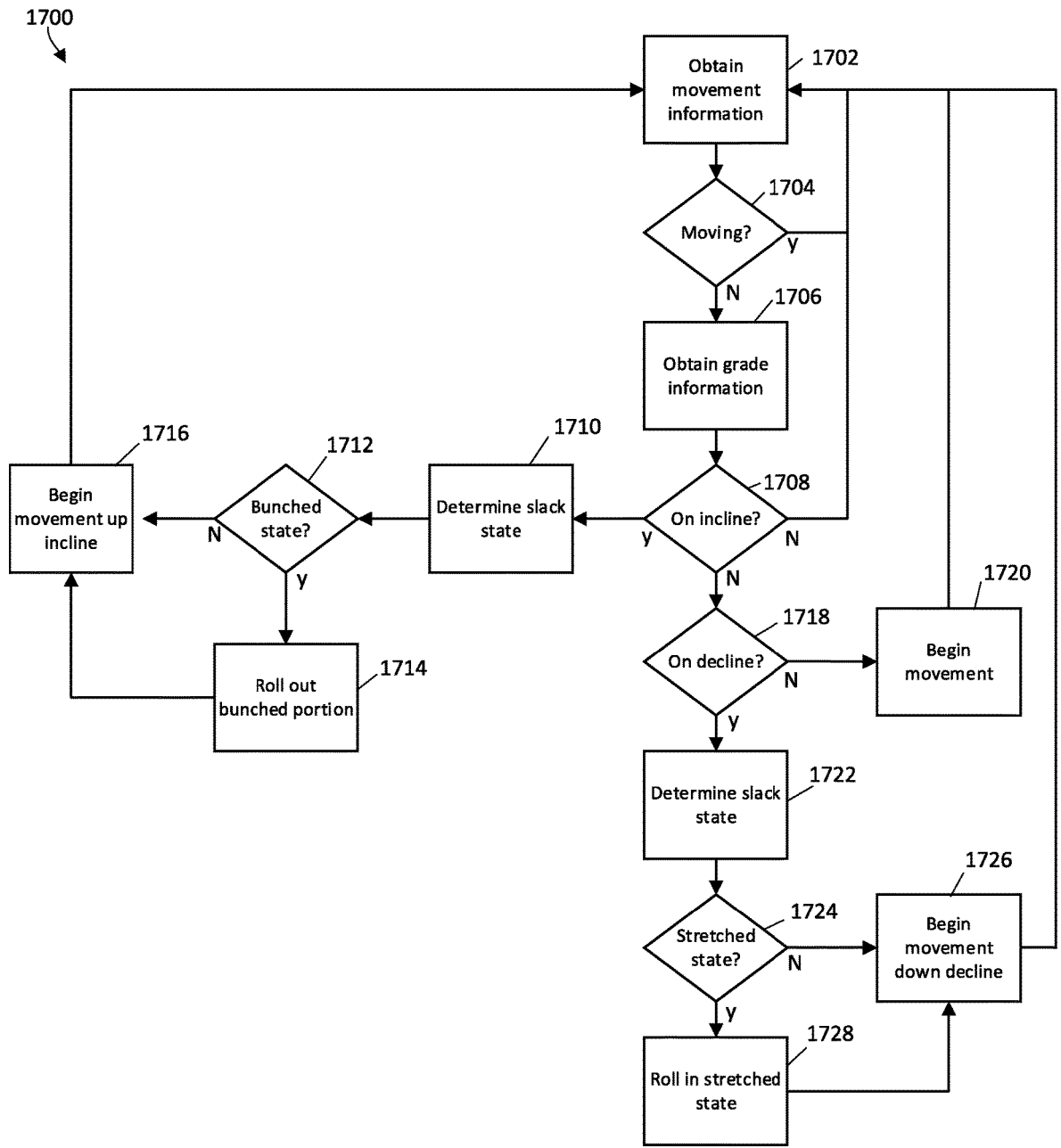
FIG. 17 illustrates a flow chart of a method of controlling a vehicle system, according to an embodiment of the disclosure.

FIG. 17 illustrates a flow chart of one embodiment of a method 1700 of controlling a vehicle system. The method 1700 can represent the operations performed by the controller 103 to determine when a vehicle system 108 has a designated slack state when stationary and on an uphill or downhill grade.

At 1702, movement information can be obtained. The movement information can be obtained from one or more movement sensors onboard the vehicle. The movement sensor can be a GPS unit (used to track the direction and/or speed of the vehicle system via satellite), a tachometer, operator input, or the like.

At 1704, a determination can be made whether the vehicle is stationary. The controller receives information from the one or more movement sensors onboard the vehicle. The controller can analyze the information from the one or more movement sensors. The information from the sensor can be received by the controller in terms of speed, distance, and the like. If the controller determines that the vehicle is moving, the process moves back to monitoring at the beginning of the process at 1702. If the controller determines that the vehicle is not moving, the process goes on to 1706.

For example, a vehicle can appear to be non-moving along a route. However, the controller of the vehicle may receive information from the built-in GPS unit that indicates that the vehicle is moving at 1 mile per hour. The output from the movement sensor can be used by the controller to determine that the vehicle is moving. The controller can decide to not take action and continue monitoring in this situation. Conversely, if the sensor outputs information that indicates that the vehicle is stationary, the controller takes action by monitoring output from other sensors, such as the grade sensor and location sensor.

At 1706, the controller can obtain grade information. The grade information can be obtained from a grade sensor. The grade information can be whether the vehicle is on an incline or decline, angle of incline or decline, or the like. After the controller obtains the grade information from the sensor, the process proceeds to 1708.

At 1708, the controller determines whether the vehicle is on an incline. If the controller determines that the vehicle is on an incline, the controller can proceed to 1710. However, if the controller determines that the vehicle is not on an incline, the controller can direct the process to proceed to 1718.

At 1710, the controller can determine the slack state of the vehicle. The output from the location sensor can be utilized by the controller to determine slack state. The controller can determine that the vehicle slack state is bunched, stretched, or neither, according to information from the location sensor. The controller can direct the process to 1712.

For example, the controller can obtain and use information from the location sensor and determines that the vehicle is on an incline, location data can be received from location determination devices onboard sections of the vehicle system. For example, the controller may receive the location data from the location determination devices. The sections of the vehicle system may be individual vehicles, or groups of vehicles. In one embodiment, a location determination device can be onboard one or more vehicles within a section. In one embodiment, a location determination device can be onboard less than every vehicle within a section. For example, a section of vehicles may include ten vehicles. A location determination device can be onboard only one of the ten vehicles.

At 1712, the controller can determine whether the vehicle slack state is bunched. If the controller determines that the vehicle slack state is bunched, the controller can determine that corrective action is required. A bunched slack state can occur when separation distances between the sections of the vehicle system are less than a determined lower separation distance threshold. If one or more of the separation distances is less than the determined lower safe separation distance threshold, the method proceeds from 1712 toward 1714, in which the vehicle system is controlled to increase the separation distance(s). If the controller determines that the vehicle slack state is not bunched, the process can determine that no correct action is required and direct the process to 1716.

At 1714, the controller can direct the vehicle to take corrective action to increase the bunched separation distances. The controller can direct the vehicle system to perform a controlled roll-out of the bunched section. After the controlled roll-out has completed, the process moves to 1716.

For example, the controller can direct the vehicle to perform a controlled roll-out that includes adjusting braking and/or throttle of one or more vehicles until the slack state is no longer bunched. The controller can receive information from the location sensor to monitor the vehicle slack state to determine when the roll-out is complete.

At 1716, the vehicle system begins movement up the incline. The controller can direct the process back to monitoring at the beginning at 1702 or may terminate.

At 1718, the controller can determine whether the vehicle system is stationary on a downhill grade. The controller can receive information from the grade sensor that the controller can utilize to determine whether the vehicle system is on a declined grade. If the controller determines that the vehicle is on a declined grade, the controller can proceed to 1722. However, if the controller determines that the vehicle is not on a declined grade, the controller can direct the process to 1720.

At 1720, the controller can direct the vehicle system to begin movement. The controller directs this action because the vehicle system is stationary, but not on an incline or a decline. Thus, the controller does not require any corrective action.

At 1722, the controller can determine the vehicle slack state. The location sensor can provide information that the controller can utilize to determine slack state. The controller can determine that the vehicle slack state is bunched, stretched, or neither, according to information from the location sensor. The controller can direct the process to 1724.

For example, the controller can obtain and use information from the location sensor and determines that the vehicle is on a decline, location data can be received from location determination devices onboard sections of the vehicle system. For example, the controller may receive the location data from the location determination devices. The sections of the vehicle system may be individual vehicles, or groups of vehicles. In one embodiment, a location determination device can be onboard one or more vehicles within a section. In one embodiment, a location determination device can be onboard less than every vehicle within a section. For example, a section of vehicles may include ten vehicles. A location determination device can be onboard only one of the ten vehicles.

At 1724, based on information from one or more location sensors, the controller can determine whether the vehicle slack state is stretched. The controller can determine that a stretched vehicle slack state occurs when separation distances between the sections of the vehicle system are greater than a determined upper safe separation distance threshold. If one or more of the separation distances is greater than the determined upper safe separation distance threshold, the method proceeds from 1724 to 1728, in which the vehicle system is controlled to reduce the separation distance(s). If, however, the separation distance(s) is not greater than a determined upper safe distance threshold at 1724, the controller can determine that no corrective action is required. The method proceeds to 1726.

At 1728, the controller can direct the vehicle to take corrective action to decrease the stretched separation distances. The controller can direct the vehicle system to perform a controlled run-in of the stretched section. After the controlled run-in has completed, the process moves to 1726.

For example, the controller can direct the vehicle to perform a controlled run-in that includes adjusting braking and/or throttle of one or more vehicles until the slack state is no longer stretched. The controller can receive information from the location sensor to monitor the vehicle slack state to determine when the run-in is complete.

At 1726, the controller can determine that the slack state is no longer stretched, the run-in is complete, and direct the vehicle system to begin movement down the decline. The controller can direct the process back to monitoring at the beginning at 1702.

As mentioned, aspects of the inventive subject matter relate to controlling braking and/or propulsion of a vehicle system based on a determined slack condition (e.g., while the vehicle system is parked, such as parked on a grade) and while transitioning the vehicle system from being parked and stationary to forward or rearward movement. This may include concurrently braking one or more vehicles in the vehicle system while those vehicles and/or other vehicles are controlled for moving forward or rearward. It may also include controlling the braking and/or propulsion systems of one or more vehicles individually, i.e., at least one vehicle is concurrently controlled differently than one or more other vehicles in the vehicle system. Braking control may include one or more of: (i) controlling ECP brakes (e.g., one or more vehicles in the vehicle system each have an air brake that receives air pressure from a brake pipe, but which are controlled electronically and independently of the brake pipe for faster release and engagement than control over the brake pipe); (ii) controlling an electronic brake system (e.g., one or more vehicles in the vehicle system each have a control unit that is electrically controllable to control the pneumatic, brake pipe-based air brakes of the vehicle, as opposed to, for example, purely mechanical control of a brake pipe-based air brake system); (iii) distributed power control (e.g., a designated propulsion generating vehicle in the vehicle system remotely controls other propulsion generating vehicles in the vehicle system, over a wired and/or wireless connection, for coordinated braking and throttle control); (iv) dynamic or regenerative braking (e.g., motors are switched from a propulsion mode to an electrical generation mode, whereby the motors are turned by vehicle movement and generate electricity and concurrently establish an electromotive force drag on the vehicle for braking purposes, with the resultant electricity either being dissipated as waste heat in resistor grids provided for that purpose, used for onboard electrical loads, and/or stored in an energy storage device for later use); (v) etc. Propulsion control may include controlling traction motors, engines, etc.

Certain embodiments of the present disclosure provide a vehicle control system that can include a controller configured to determine a slack condition of a multi-vehicle system while the multi-vehicle system is parked. The controller can also be configured to determine the slack condition based on one or more sensor signals received from at least one sensor. The controller can also be configured to control movement of the multi-vehicle system based on the slack condition that is determined while transitioning from being parked to forward motion.

Optionally, the controller can be configured to determine the slack condition of the multi-vehicle system while the multi-vehicle system is parked on a grade.

Optionally, the at least one sensor can include plural sensors and the controller can be configured to determine the slack condition based on output from the plural sensors disposed onboard different vehicles in the multi-vehicle system.

Optionally, responsive to the controller determining that the slack condition is a bunched state and the multi-vehicle system on an inclined grade, the controller can be configured to control the movement of the multi-vehicle system. The movement can be controlled according to one or more designated vehicle movement limits by controlling a brake system of the multi-vehicle system. The brake system can be directed to continue providing at least some braking effort in one or more uphill vehicles in the multi-vehicle system. The braking effort can be provided to cause roll-out of one or more downhill vehicles in the multi-vehicle system away from the one or more uphill vehicles.

Optionally, the one or more designated vehicle movement limits can include one or more vehicle speed or acceleration thresholds. The thresholds can be absolute or relative to one or more other vehicles in the multi-vehicle system that would avoid causing inter-vehicle forces to exceed a threshold.

Optionally, the controller can be configured to control the brake system by sequentially releasing brakes of the downhill vehicles in an order to proceed up the inclined grade.

Optionally, the controller can be configured to gradually release brakes of the one or more downhill vehicles.

Optionally, responsive to the controller determining that the slack condition is a stretched state and the multi-vehicle system on a declined grade, the controller can be configured to control the movement of the multi-vehicle system. The controller can control the movement according to designated vehicle movement limits by controlling a brake system of the multi-vehicle system. The brake system can be directed to continue providing at least some braking effort in one or more downhill vehicles in the multi-vehicle system. The braking effort can be provided to cause roll-in of one or more uphill vehicles in the multi-vehicle system toward the one or more downhill vehicles.

Optionally, the one or more designated vehicle movement limits can include one or more vehicle speed or acceleration thresholds. The thresholds can be absolute or relative to one or more other vehicles in the multi-vehicle system that would avoid causing inter-vehicle forces to exceed a threshold.

Optionally, the controller can be configured to control the brake system by sequentially releasing brakes of the uphill vehicles in an order to proceed down the declined grade.

Optionally, the controller can be configured to gradually release brakes of the one or more uphill vehicles.

Certain embodiments of the present disclosure provide a method that can include determining a current slack state of a vehicle system formed from plural vehicles. The vehicle system can be in a stationary state and located on a grade. The current slack state can indicate that one or more groups of the vehicles are being bunched together or stretched apart. The method can also include individually controlling one or more brake systems or propulsion systems of the vehicles to change the current slack state of the vehicle system. The current slack state can be changed to a designated slack state while transitioning from the stationary state to a forward movement state of the vehicle system.

Optionally, the method can include that the vehicles in the one or more groups are bunched together while the vehicles in the one or more groups are closer to each other than a designated separation distance.

Optionally, the method can include that the vehicles in the one or more groups are stretched apart while the vehicles in the one or more groups are no closer to each other than a designated separation distance.

Optionally, the method can include that the vehicles in the vehicle system are mechanically coupled with each other by couplers and the current slack state indicates one or more inter-vehicle forces exerted on the couplers.

Optionally, the method can include that the vehicles in the vehicle system are not mechanically coupled with each other and the current slack state indicates one or more separation distances between the vehicles.

Optionally, the method can include that the designated slack state is based on the grade, the designated slack state being a stretched state when the grade is an incline, the designated slack state being a compressed state when the grade is a decline.

Optionally, the method can include that, responsive to the vehicle system being on an incline, the current slack state can indicate that the vehicles in the one or more groups are bunched together. The forward movement state can indicate that the vehicle system is moving up the incline. The current slack state can be changed to a stretched slack state as the designated slack state by sequentially releasing the brake systems of the vehicles in the one or more groups in an order that proceeds up the incline.

Optionally, the method can include that, responsive to the vehicle system being on a decline, the current slack state can indicate that the vehicles in the one or more groups are stretched apart. The forward movement state can indicate that the vehicle system is moving down the decline. The current slack state can be changed to a bunched slack state as the designated slack state by sequentially releasing the brake systems of the vehicles in the one or more groups in an order that proceeds down the decline.

Optionally, the method can include that, responsive to the vehicle system being on an incline, the current slack state can indicate that the vehicles in the one or more groups are bunched together. The forward movement state can indicate that the vehicle system is moving up the incline. The current slack state can be changed to a stretched slack state as the designated slack state by sequentially generating propulsive force using the propulsion systems of the vehicles in the one or more groups in an order that proceeds down the incline.

Optionally, the method can include that, responsive to the vehicle system being on a decline, the current slack state can indicate that the vehicles in the one or more groups are stretched apart. The forward movement state can indicate that the vehicle system is moving down the decline. The current slack state can be changed to a bunched slack state as the designated slack state by sequentially generating propulsive force using the propulsion systems of the vehicles in the one or more groups in an order that proceeds up the decline.

Certain embodiments of the present disclosure provide a vehicle control system that can include a controller. The controller can be configured to determine a current slack state of a vehicle system formed from plural vehicles while the vehicle system is in a stationary state and is located on a grade. The current slack state can indicate that one or more groups of the vehicles is being bunched together or stretched apart. The controller can also be configured to individually control one or more brake systems or propulsion systems of the vehicles to change the current slack state of the vehicle system. The current slack state can be changed to a designated slack state while transitioning from the stationary state to a forward movement state of the vehicle system.

Optionally, the vehicles in the one or more groups can be bunched together while the vehicles in the one or more groups are closer to each other than a designated separation distance.

Optionally, the vehicles in the one or more groups can be stretched apart while the vehicles in the one or more groups are no closer to each other than a designated separation distance.

Optionally, the controller can be configured to determine the current slack state based on locations of two or more of the vehicles as measured by at least one sensor onboard the vehicle system.

Optionally, the vehicles in the vehicle system can be mechanically coupled with each other by couplers and the controller can be configured to determine the current slack state based on one or more force sensors that measure one or more inter-vehicle forces exerted on the couplers.

Optionally, the vehicles in the vehicle system may not be mechanically coupled with each other and the controller can be configured to determine the current slack state based on one or more distance sensors that measure one or more separation distances between the vehicles.

Optionally, the controller can be configured to determine the designated slack state based on the grade. The designated slack state can be determined to be a stretched state when the grade is an incline. The designated slack state can be determined to be a compressed state when the grade is a decline.

Optionally, responsive to the vehicle system being on an incline, the current slack state can indicate that the vehicles in the one or more groups are bunched together. The forward movement state can indicate that the vehicle system is moving up the incline. The controller can be configured to change the current slack state. The current slack state can be changed to a stretched slack state as the designated slack state by sequentially releasing the brake systems of the vehicles in the one or more groups in an order that proceeds up the incline.

Optionally, responsive to the vehicle system being on a decline, the current slack state can indicate that the vehicles in the one or more groups are stretched apart. The forward movement state can indicate that the vehicle system is moving down the decline. The controller can be configured to change the current slack state to a bunched slack state as the designated slack state by sequentially releasing the brake systems of the vehicles in the one or more groups in an order that proceeds down the decline.

Optionally, responsive to the vehicle system being on an incline, the current slack state can indicate that the vehicles in the one or more groups are bunched together. The forward movement state can indicate that the vehicle system is moving up the incline. The controller can be configured to change the current slack state to a stretched slack state as the designated slack state. The current slack state can be changed to a stretched slack state by sequentially generating propulsive force using the propulsion systems of the vehicles in the one or more groups in an order that proceeds down the incline.

Optionally, responsive to the vehicle system being on a decline, the current slack state can indicate that the vehicles in the one or more groups are stretched apart. The forward movement state can indicate that the vehicle system is moving down the decline. The controller can be configured to change the current slack state to a bunched slack state as the designated slack state. The current slack state can be changed to a bunched slack state by sequentially generating propulsive force using the propulsion systems of the vehicles in the one or more groups in an order that proceeds up the decline.

To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a signal processor, microcontroller, random access memory, hard disk, and the like). Similarly, the programs may be stand-alone programs, may be incorporated as subroutines in an operating system, may be functions that are part of an installed software package, and the like. The various embodiments are not limited to the arrangements and instrumentality shown in the drawings.

As used herein, the term "control unit," "unit" (such as the handling unit or the route guidance unit), "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, one or more of the handling unit and the route guidance unit may be or include one or more processors that may control and/or direct operation of the vehicle system.

The diagrams of embodiments herein may illustrate one or more control or processing units, such as the handling unit and the route guidance unit. The processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, one or more of the handling unit and the route guidance unit may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that incorporate the recited features. Moreover, unless explicitly stated to the contrary, embodiments "comprising," "including," or "having" an element or a plurality of elements having a particular property may include additional such elements not having that property. A structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

This written description uses examples to disclose several embodiments of the inventive subject matter and to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle control system comprising:
a controller configured to determine that a vehicle system comprising multiple vehicles is in a stationary state and located on a grade, the controller further configured to determine a slack condition of the vehicle system in the stationary state and on the grade based on one or more sensor signals generated by one or more sensors, wherein the controller is configured to control one or more of a braking effort or a tractive effort of at least one of the vehicles of the vehicle system, based on the slack condition that is determined, to change a separation distance between two vehicles of the vehicle system.

2. The vehicle control system of claim 1, wherein the controller is configured to control the one or more of the braking effort or the tractive effort to change the separation distance between the two vehicles prior to movement of all of the vehicles of the vehicle system in a common direction along the grade.

3. The vehicle control system of claim 1, wherein, responsive to the controller determining that the slack condition of the vehicle system is bunched, the controller is configured to control the one or more of the braking effort or the tractive effort to perform a controlled roll-out of the vehicle system along the grade to increase the separation distance between the two vehicles until the slack condition is no longer bunched.

4. The vehicle control system of claim 3, wherein the controller is configured to perform the controlled roll-out by directing one or more uphill vehicles of the vehicle system to maintain a braking effort provided by the one or more uphill vehicles and directing one or more downhill vehicles of the vehicle system to reduce a braking effort provided by the one or more downhill vehicles to allow the one or more downhill vehicles to roll down the grade in a direction away from the one or more uphill vehicles.

5. The vehicle control system of claim 4, wherein the controller is configured to monitor movement of the one or more downhill vehicles down the grade during the controlled roll-out and to adjust the braking effort provided by the one or more downhill vehicles during the controlled roll-out to maintain the movement within one or more designated vehicle movement limits.

6. The vehicle control system of claim 3, wherein the controller is configured to perform the controlled roll-out by directing one or more uphill vehicles of the vehicle system to generate tractive effort in a direction up the grade, without directing one or more downhill vehicles of the vehicle system to concurrently generate tractive effort up the grade.

7. The vehicle control system of claim 3, wherein the controller is configured to perform the controlled roll-out by directing one or more downhill vehicles of the vehicle system to generate tractive effort in a direction down the grade and directing one or more uphill vehicles of the vehicle system to at least partially maintain a braking effort provided by the one or more uphill vehicles.

8. The vehicle control system of claim 1, wherein, responsive to the controller determining that the slack condition of the vehicle system is stretched, the controller is configured to control the one or more of the braking effort or the tractive effort to perform a controlled run-in of the vehicle system along the grade to decrease the separation distance between the two vehicles until the slack condition is no longer stretched.

9. The vehicle control system of claim 8, wherein the controller is configured to perform the controlled run-in by directing one or more downhill vehicles of the vehicle system to maintain a braking effort provided by the one or more downhill vehicles and directing one or more uphill vehicles of the vehicle system to reduce a braking effort provided by the one or more uphill vehicles to allow the one or more uphill vehicles to roll down the grade in a direction towards the one or more downhill vehicles.

10. The vehicle control system of claim 9, wherein the controller is configured to monitor movement of the one or more uphill vehicles down the grade during the controlled run-in and to adjust the braking effort provided by the one or more uphill vehicles during the controlled run-in to maintain the movement within one or more designated vehicle movement limits.

11. The vehicle control system of claim 8, wherein the controller is configured to perform the controlled run-in by directing one or more uphill vehicles of the vehicle system to generate tractive effort in a direction down the grade, and directing one or more downhill vehicles of the vehicle system to at least partially maintain a braking effort provided by the one or more downhill vehicles.

12. The vehicle control system of claim 8, wherein the controller is configured to perform the controlled run-in by directing one or more downhill vehicles of the vehicle system to generate tractive effort in a direction up the grade without directing one or more uphill vehicles of the vehicle system to concurrently generate tractive effort up the grade.

13. The vehicle control system of claim 1, wherein the controller is configured to determine that the vehicle system is in the stationary state based on sensor signals generated by one or more of a global positioning system (GPS) receiver or a tachometer onboard the vehicle system, and the controller is configured to determine that the vehicle system is on the grade based on sensor signals generated by one or more of an inclinometer, a tilt sensor, a Hall effect sensor, or the GPS receiver used in conjunction with a route database that associates different grades with different locations.

14. A method comprising:
determining, via one or more processors, that a vehicle system comprising multiple vehicles is in a stationary state and located on a grade;
determining a slack condition of the vehicle system in the stationary state and on the grade based on one or more sensor signals generated by one or more sensors; and
controlling one or more of a braking effort or a tractive effort of at least one of the vehicles of the vehicle system, based on the slack condition that is determined, to change a separation distance between two vehicles of the vehicle system.

15. The method of claim 14, further comprising directing movement of all of the vehicles of the vehicle system in a common direction along the grade after the separation distance is changed.

16. The method of claim 14, wherein the slack condition that is determined is one of bunched or stretched, and the method further comprises verifying that the slack condition is no longer bunched or stretched after controlling the one or more of the braking effort or the tractive effort and before permitting the vehicle system to move as a unit along the grade in a planned travel direction.

17. The method of claim 14, wherein responsive to the slack condition being determined as bunched, the one or more of the braking effort or the tracking effort is controlled to perform a controlled roll-out of the vehicle system along the grade to increase the separation distance between the two vehicles until the slack condition is no longer bunched.

18. The method of claim 17, wherein the controlled roll-out is performed by one or more of:
(i) directing one or more uphill vehicles of the vehicle system to maintain a braking effort provided by the one or more uphill vehicles and directing one or more downhill vehicles of the vehicle system to reduce a braking effort provided by the one or more downhill vehicles to allow the one or more downhill vehicles to roll down the grade in a direction away from the one or more uphill vehicles;
(ii) directing the one or more uphill vehicles to generate tractive effort in a direction up the grade, without directing the one or more downhill vehicles to concurrently generate tractive effort up the grade; or
(iii) directing the one or more downhill vehicles to generate tractive effort in a direction down the grade and directing the one or more uphill vehicles to at least partially maintain a braking effort provided by the one or more uphill vehicles.

19. The method of claim 14, wherein responsive to the slack condition being determined as stretched, the one or more of the braking effort or the tracking effort is controlled to perform a controlled run-in of the vehicle system along the grade to decrease the separation distance between the two vehicles until the slack condition is no longer stretched.

20. The method of claim 19, wherein the controlled run-in is performed by one or more of:
(i) directing one or more downhill vehicles of the vehicle system to maintain a braking effort provided by the one or more downhill vehicles and directing one or more uphill vehicles of the vehicle system to reduce a braking effort provided by the one or more uphill vehicles to allow the one or more uphill vehicles to roll down the grade in a direction towards the one or more downhill vehicles;
(ii) directing the one or more uphill vehicles to generate tractive effort in a direction down the grade, and directing the one or more downhill vehicles to at least partially maintain a braking effort provided by the one or more downhill vehicles; or
(iii) directing the one or more downhill vehicles to generate tractive effort in a direction up the grade without directing the one or more uphill vehicles to concurrently generate tractive effort up the grade.

* * * * *